US007135200B2

(12) United States Patent
Shimizu et al.

(10) Patent No.: US 7,135,200 B2
(45) Date of Patent: Nov. 14, 2006

(54) PROCESS FOR PRODUCING MALT ALCOHOLIC DRINK

(75) Inventors: Chikako Shimizu, Yaizu (JP); Masachika Takashio, Yaizu (JP)

(73) Assignee: Sapporo Breweries Limited, Tokyo (JP)

( * ) Notice: Subject to any disclaimer, the term of this patent is extended or adjusted under 35 U.S.C. 154(b) by 160 days.

(21) Appl. No.: 10/070,814

(22) PCT Filed: Jul. 11, 2001

(86) PCT No.: PCT/JP01/05995

§ 371 (c)(1),
(2), (4) Date: Mar. 11, 2002

(87) PCT Pub. No.: WO02/04593

PCT Pub. Date: Jan. 17, 2002

(65) Prior Publication Data

US 2003/0072845 A1 Apr. 17, 2003

(30) Foreign Application Priority Data

Jul. 11, 2000 (JP) ............................. 2000-210478

(51) Int. Cl.
 *C12H 1/04* (2006.01)
(52) U.S. Cl. .................... 426/16; 426/592; 426/271
(58) Field of Classification Search ................ 426/16, 426/592
See application file for complete search history.

(56) References Cited

U.S. PATENT DOCUMENTS 4,156,025 A * 5/1979 Dalgleish .................... 426/271
6,001,406 A * 12/1999 Katzke et al. ............... 426/422

FOREIGN PATENT DOCUMENTS

| CA | 2052435 | * | 4/1993 |
| EP | 806474 | | 11/1997 |
| JP | 52-5688 | | 1/1977 |
| JP | 52-005688 | | 1/1977 |
| JP | 5-317029 | | 12/1993 |
| JP | 05-317029 | | 12/1993 |
| JP | 08-198616 | | 8/1996 |
| JP | 8-198616 | | 8/1996 |
| JP | 2000-004866 | | 1/2000 |

OTHER PUBLICATIONS

Derwent Publications, XP-002270380, 2 pages, AN 1993-189018, CA 2 052 435, Apr. 2, 1993.

* cited by examiner

*Primary Examiner*—Anthony Weier
(74) *Attorney, Agent, or Firm*—Oblon, Spivak, McClelland, Maier & Neustadt, P.C.

(57) ABSTRACT

In the method of producing a malt alcohol beverage, an adsorbent is used to remove through adsorption at least a part of rough flavor components from malt, a malt alcohol beverage intermediate product, or the malt alcohol beverage. As a result, the aging of flavor after production can be suppressed and the flavor immediately after production can be maintained over a prolonged period of time.

15 Claims, 21 Drawing Sheets

PROCESS FOR PRODUCING MALT ALCOHOLIC DRINK

TECHNICAL FIELD

This invention relates to a method of producing a malt alcohol beverage. More particularly, it relates to a method of producing a malt alcohol beverage by suppressing the generation of stale flavor after production of the malt alcohol beverage.

BACKGROUND ART

In malt alcohol beverages (such as beer and low-malt beer (Happoshu)) that use malt as a raw material, a variety of reactions, including oxidation and dehydration of their components, are promoted during or after their production by virtue of the lapse of time or the increase in temperature (generally referred to as "the stale flavor of malt alcohol beverages"). Consequently, it is known that the original flavor of malt alcohol beverages is impaired.

Therefore, different measures are taken in order to prevent the qualities of such malt alcohol beverages from being deteriorated. Specifically, among others the quality control after production, the time management after production to sale, the temperature control during transportation are strictly enforced, which allows products with freshness and high quality to be provided. However, even if the aforementioned management is thoroughly employed, it has been difficult to stably maintain the freshness obtained immediately after production for a prolonged period of time.

A method of suppressing the oxidation of a malt alcohol beverage during its production to stably maintain the freshness immediately after production was developed that relays on decreasing the oxygen concentration of the atmosphere in the entire process or a part thereof during the production of the malt alcohol beverage (Japanese Patent Application Laid-Open Gazette No. 2000-4866). According to this method, by decreasing the oxygen concentration of the atmosphere during production, the reducing power of intermediate products in the production process is enhanced with the result of increased reducing power of the final product, which has made it possible to enhance resistance to the oxidation or aging of the malt alcohol beverage.

However, while the method of producing a malt alcohol beverage described in Japanese Patent Application Laid-Open Gazette No. 2000-4866 can prevent the malt alcohol beverage from being oxidized to certain degree, it is not necessarily adequate to suppress the aging of the flavor after production for a prolonged period of time.

DISCLOSURE OF THE INVENTION

In light of the aforementioned problems inherent in the prior art this invention has been made, and it aims at providing a method of producing a malt alcohol beverage by which the aging of the flavor after production is suppressed and the flavor immediately after the production can be maintained over a prolonged period of time.

In order to accomplish the aforementioned object, the present inventors researched diligently and consequently, discovered that by removing through adsorption rough flavor (powdery) components in the malt alcohol beverage with the aid of an adsorbent during the production process of the malt alcohol beverage, it was possible to suppress the aging of the flavor after production and to maintain the flavor immediately after the production over a prolonged period of time, thus leading to the completion of this invention.

Specifically, this invention relates to a method of producing a malt alcohol beverage comprising removing through adsorption at least a part of rough flavor components from malt, a malt alcohol beverage intermediate product, or the malt alcohol beverage with the aid of an adsorbent.

Also, in the method of producing a malt alcohol beverage according to this invention, the adsorbent is preferably an ion-exchange resin or a synthetic adsorbent.

Further, in the method of producing a malt alcohol beverage according to the invention, the rough flavor component is a causative substance for the aging of flavor or a precursor thereof: there are mentioned, for example, a carbonyl compound or a Maillard compound.

Also, in the method of producing a malt alcohol beverage according to the invention, the rough flavor component includes an organic acid.

BRIEF DESCRIPTION OF THE DRAWINGS

FIG. 21A is a graph showing the sum of hydrophilic peaks from the beer filtered through an adsorbent, as detected by HPLC.

FIG. 21B is a graph showing the sum of hydrophobic peaks from the beer filtered through the adsorbent, as detected by HPLC.

BEST MODE FOR CARRYING OUT THE INVENTION

Figure 1A:
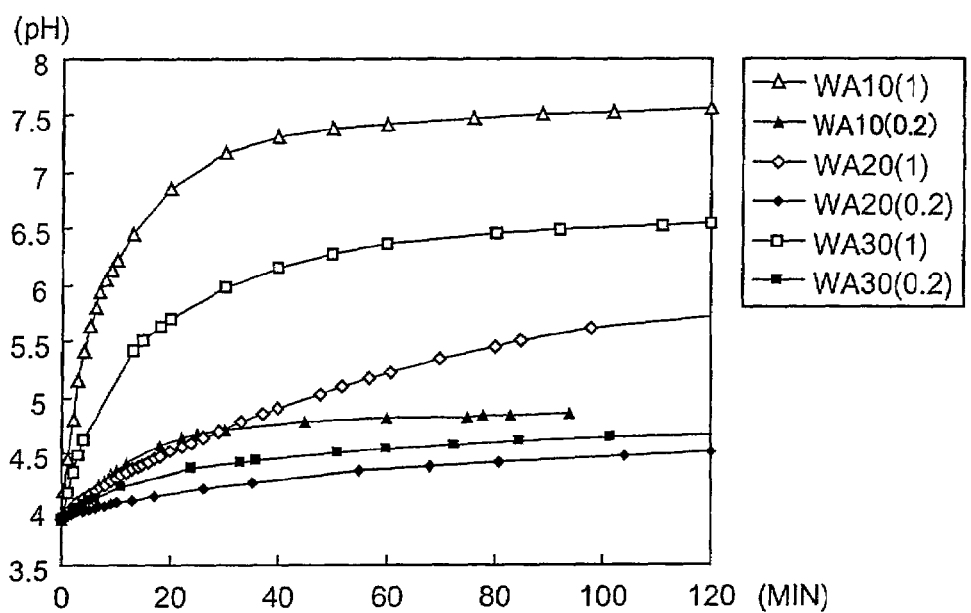
FIG. 1A is a graph showing the relationship between time and pH upon addition of ion-exchange resins to a low-malt beer.
Figure 1B:
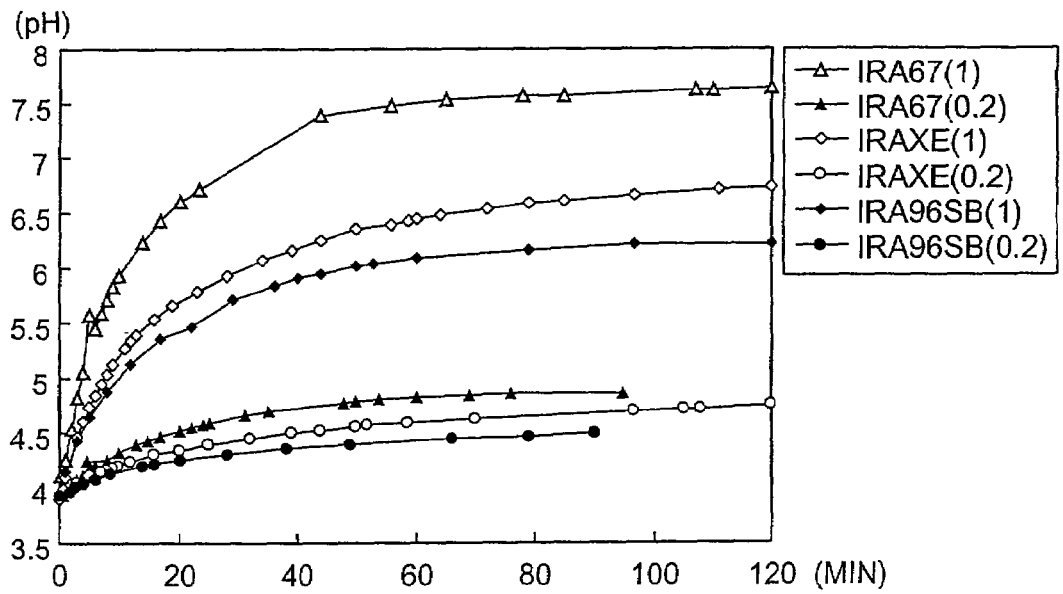
FIG. 1B is a graph showing the relationship between time and pH upon addition of ion-exchange resins to the low-malt beer.
Figure 2A:
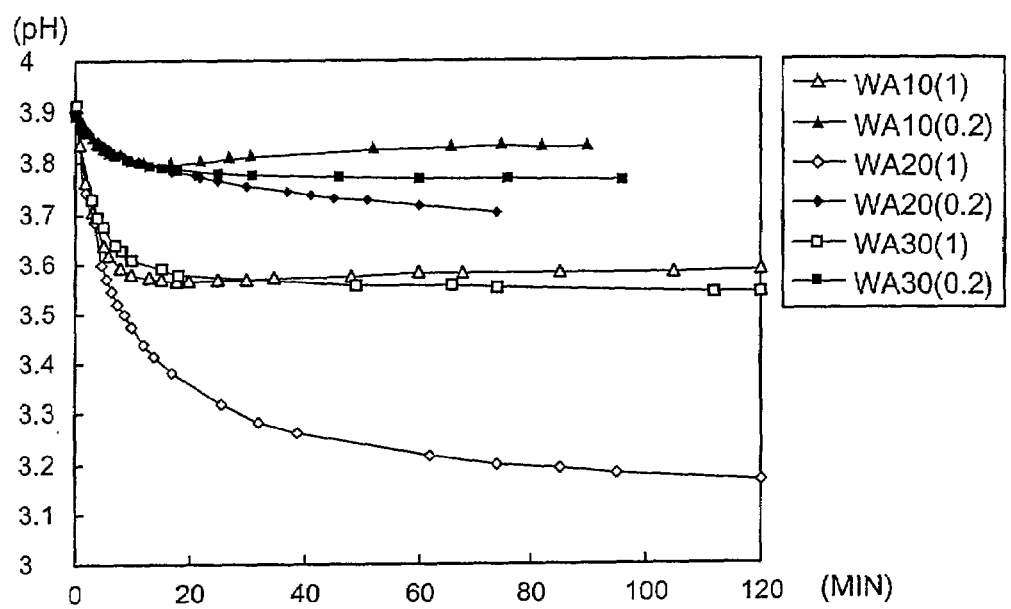
FIG. 2A is a graph showing the relationship between time and pH upon addition of the ion-exchange resins to the low-malt beer.
Figure 2B:
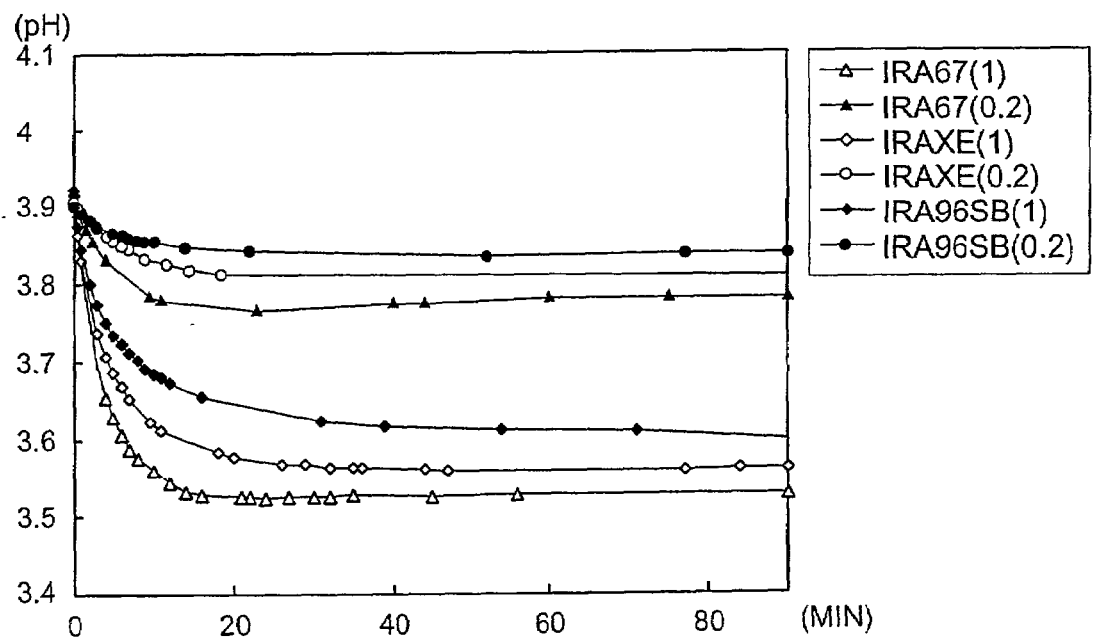
FIG. 2B is a graph showing the relationship between time and pH upon addition of the ion-exchange resins to the low-malt beer.
Figure 3A:
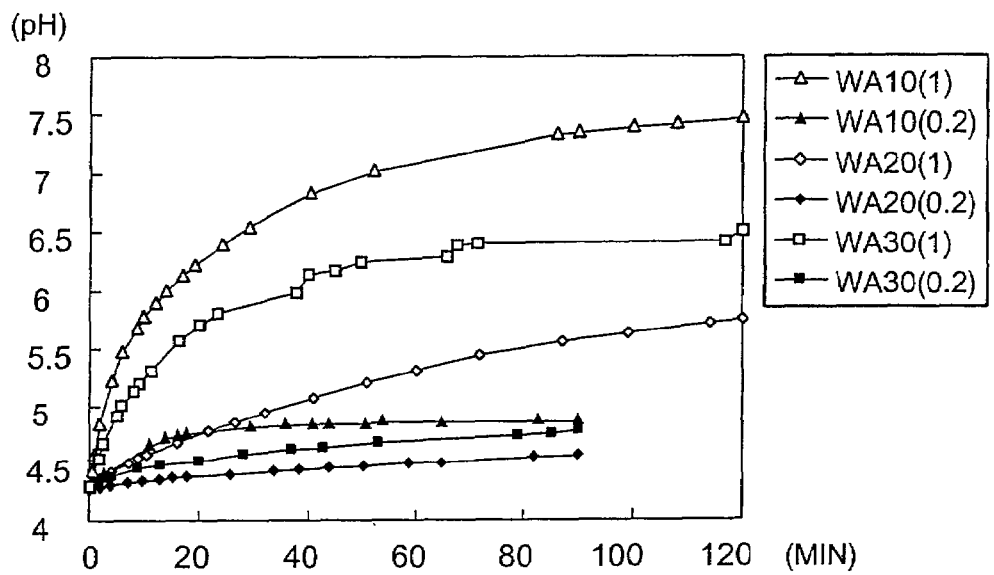
FIG. 3A is a graph showing the relationship between time and pH upon addition of the ion-exchange resins to a beer.
Figure 3B:
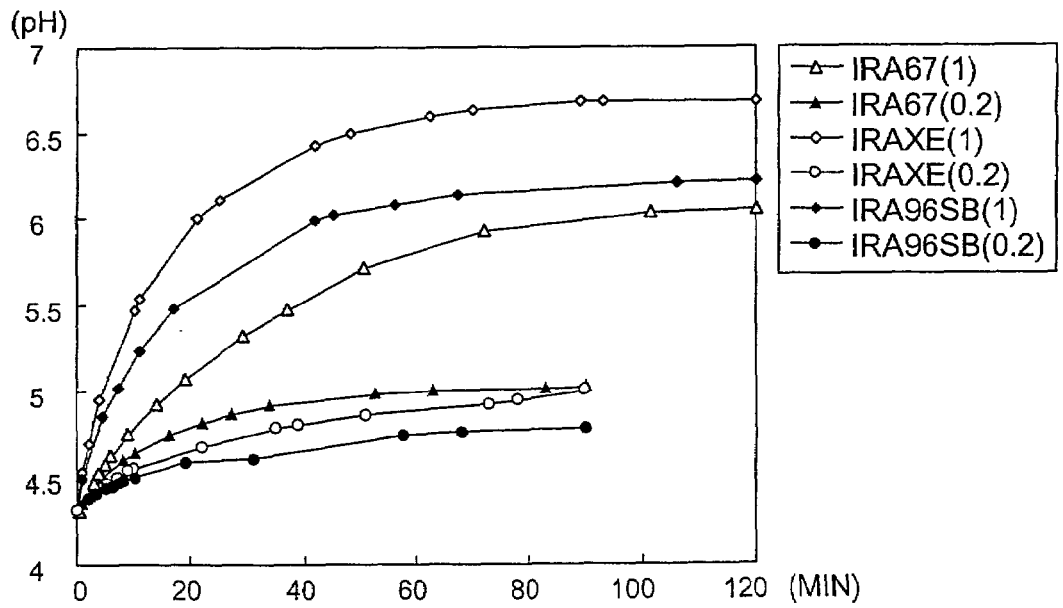
FIG. 3B is a graph showing the relationship between time and pH upon addition of the ion-exchange resins to the beer.
Figure 4A:
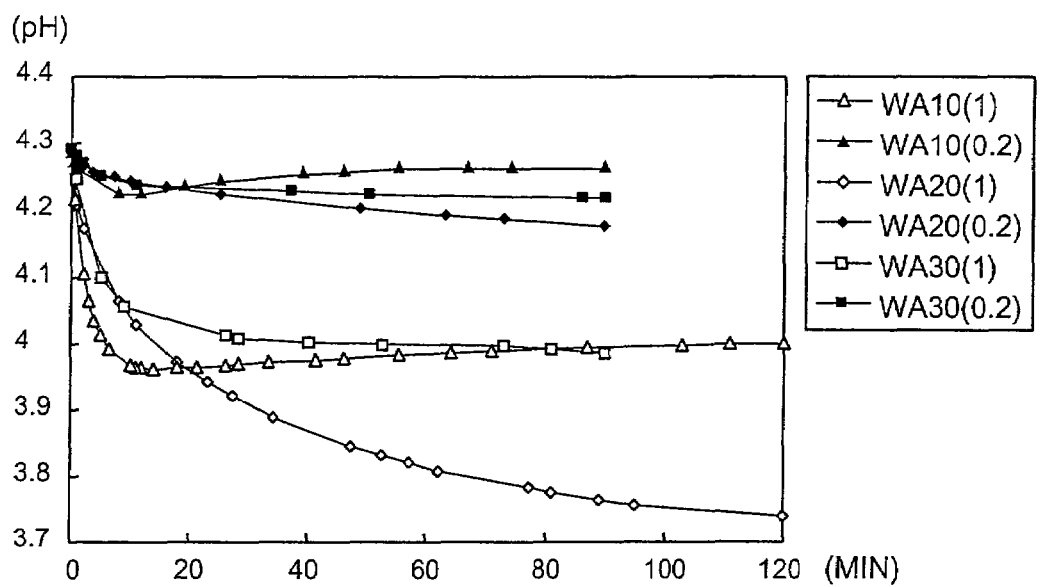
FIG. 4A is a graph showing the relationship between time and pH upon addition of the ion-exchange resins to the beer.
Figure 4B:
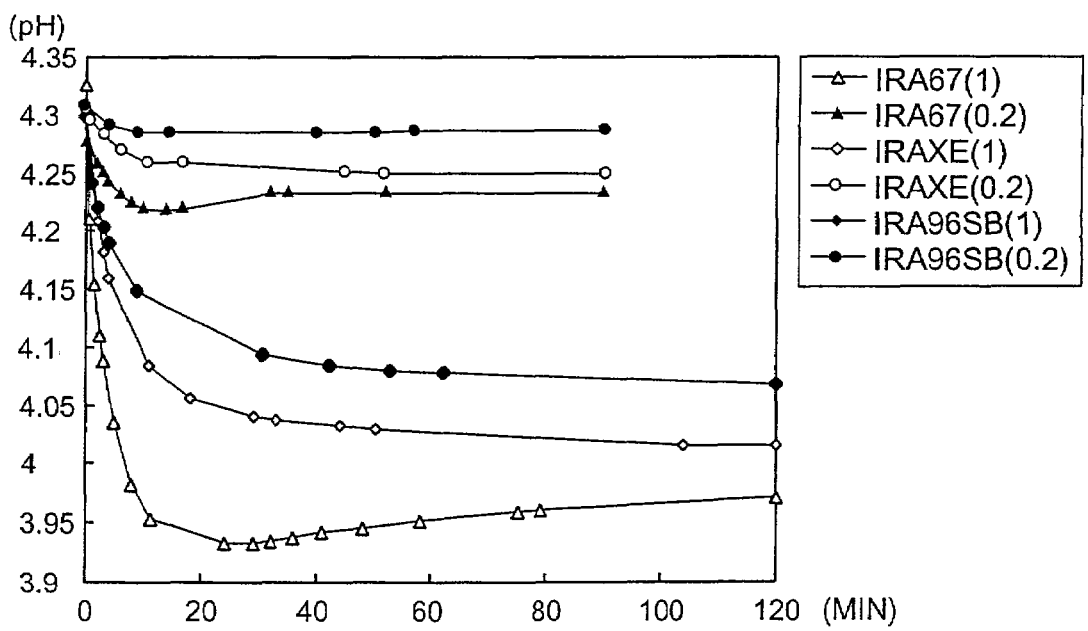
FIG. 4B is a graph showing the relationship between time and pH upon addition of the ion-exchange resins to the beer.

This invention will be described in detail with respect to preferred embodiments hereunder.

In the method of producing a malt alcohol beverage comprising: a preparation step of mixing a raw material containing malt with water for preparation, saccharifying the malt by warming the resultant mixture, and collecting wort from the saccharified malt; a fermentation step of fermenting the wort by addition of yeast thereto and obtaining a malt alcohol beverage intermediate product; a storage step of storing the malt alcohol beverage intermediate product (finished fermentation solution) obtained from the fermentation step; and a filtration step of filtering the malt alcohol beverage intermediate product (finished storage solution) obtained from the storage step to produce the malt alcohol beverage, the method of producing a malt alcohol beverage according to this invention is characterized in that it removes through adsorption at least a part of rough flavor components from malt, the malt alcohol beverage intermediate product, or the malt alcohol beverage with the aid of an adsorbent.

The malt alcohol beverage according to this invention may be any alcoholic beverage produced from malt as its raw material since the use ratio of malt employed in the production, whether large or small, is not particularly limited. Specifically, there are mentioned beer and low-malt beer (malt alcohol beverage with a malt use ratio of less than 67%) among others.

The first step of this invention is a preparation step of mixing a raw material containing malt with water for preparation, saccharifying the malt by warming the resultant mixture, and collecting wart from the saccharified malt.

The malt used in the step is preferably malt produced by providing barley with water and air to germinate and removing rootlets therefrom after drying. The malt serves as an enzyme source necessary for the production of wort and at the same time serves as a principle starch source which is a material to be saccharified. The germinated malt that has been smoke-dried is used in the malt production to give the flavor and the dye characteristic of a malt alcohol beverage. In addition, supplementary materials such as hop, cornstarch, corn grits, rice and sugars other than malt may be added as materials.

In the step of producing the wort, wort may be obtaining by mixing commercially available or prepared malt extract with water for preparation and adding the supplementary materials thereto as necessary.

The malt is added to the water for preparation and then mixed. If the supplementary materials are to be added, they may be admixed here concurrently. The water for preparation is not particularly limited, and appropriate water may be employed depending on the malt alcohol beverage to be produced. Saccharification may be carried out basically under known conditions, and for example, it is preferably carried out by warming the mixed malt and water for preparation at 65–75° C. This allows the saccharification by amylase in the malt to progress. The thus-obtained saccharified malt solution is filtered to yield wort.

The second step of this invention is a fermentation step of fermenting the wort by addition of yeast thereto and obtaining a malt alcohol beverage intermediate product.

The yeasts used here may be any yeasts for alcoholic beverages that produce alcohol, carbon dioxide, and the like by metabolizing sugar in the wort obtainable from the saccharification of malt (so-called "causing alcoholic fermentation"). Specifically, there are mentioned *Saccharomyces cerevisiae* and *Saccharomyces uvarum* among others.

The wort obtained in the preparation step is cooled and the yeast as described above is added to carry out fermentation. The fermentation conditions are not essentially different from those known in the art; and the fermentation temperature is usually 15° C. or less, preferably from 8 to 11° C. and the fermentation time is preferably from 8 to 10 days.

The third step of this invention is a storage step of storing the malt alcohol beverage intermediate product obtained from the fermentation step.

In this step the fermentation solution for which alcoholic fermentation has been completed is transferred to a sealed tank and stored. The storage conditions are not essentially different from those known in the art; and for example, the storage temperature is preferably from 0 to 2° C. and the fermentation time is preferably from 20 to 90 days. The fermentation-finished solution is stored to cause the remaining extract to undergo refermentation and maturation.

The fourth step of this invention is a filtration step of filtering the malt alcohol beverage intermediate product obtained from the storage step to produce the malt alcohol beverage.

The filtration conditions are not essentially different from those known in the art: for example, filtration aids such as diatomaceous earth, PVPP (polyvinylpolypyrrolidone), silica gel, and cellulose powder are used and the filtration is carried out at a temperature of 0±1° C. Thus the malt alcohol beverages (such as beer or low-malt beer) are produced. After the filtered malt alcohol beverages are subjected to sterile filtration or heating treatment, they are filled into tanks, barrels, bottles or cans and are shipped to the market.

The malt alcohol beverage of this invention is produced by having undergone the step of removing through adsorption at least a part of rough flavor components from malt, the malt alcohol beverage intermediate product, or the malt alcohol beverage (which will be referred to as "treated solution") with the aid of an adsorbent at any of from the first step to the fourth step, plural steps or between the first step and the fourth step.

In the method of producing a malt alcohol beverage according to this invention, the step of removing rough flavor components through adsorption with the aid of an adsorbent may be either at any of from the first step to the fourth step or between the steps, but it should preferably be carried out before filtration in the fourth step. Alternatively, the adsorptive removal of the rough flavor components may be carried out between the steps by contacting the treated solution with the adsorbent in a container or in a transfer line.

The adsorbents used in this invention and the substances to be adsorbed by the adsorbents will be described hereunder.

The adsorbents according to this invention may be any adsorbents having the function of reducing the stale flavor by removing the rough flavor components through adsorption, and include, for example, ion-exchange resins, synthetic adsorbents, and the like.

The ion-exchange resins may be largely classified into strongly acidic cation-exchange resins, weekly acidic cation-exchange resins, strongly basic anion-exchange resins, and weekly basic anion-exchange resins. The strongly/weekly acidic cation-exchange resins may be classified into the styrene type, the acrylic type and the methacrylic type; the strongly/weekly basic anion-exchange resins may be classified into the styrene type and the acrylic type. The strongly/weekly acidic cation-exchange resins, for example, include SK1B, SK104, SK110, SK112, SK116, PK208, PK212, PK216, PK220, PK228, WK10, WK11, WK100, WT01S, WK40, UBK530, UBK550, UBK535, UBK555 (all available from Mitsubishi Chemical Corporation), IR120BNa, IR124Na, IR118H, IRC50 and IRC76 (all available from Organo Corporation). The strongly/weekly basic anion-exchange resins, for example, include SA10A, SA11A, SA12A, NSA100, SA20A, SA21A, PA308, PA312, PA312, PA316, PA408, PA412, PA418, HPA25, HPA75, WA10, WA20, WA21J, WA30 (all available from Mitsubishi Chemical Corporation), IRA400C1, IRA402BLC1, IRA410C1, IRA96SB, IRA67, and IRAXE583 (all available from Organo Corporation). Among the aforementioned ion-exchange resins WA10, WA20, WA30, IRA67, IRA96SB, and IRAXE583 are preferably used, and WA10, WA20 and WA30 are more preferably used.

When the ion-exchange resin is to be used, it may be used after the exchange groups have been converted to any ionic type of the $OH^-$, $Cl^-$, sulfuric acid and hydrogensulfite types by pretreatment. Specifically, after the ion-exchange resin is washed with distilled water, it is pretreated with NaCl aqueous solution or HCl aqueous solution, in which case the $Cl^-$ type can be obtained. When it is pretreated with NaOH aqueous solution, the $OH^-$ type can be obtained; when it is pretreated with $H_2SO_4$ aqueous solution, the sulfuric acid type can be obtained; and when it is pretreated with $NaHSO_3$ aqueous solution, the hydrogensulfite type can be obtained.

When the ion-exchange resin is used, the pH of the malt alcohol beverage can be adjusted depending on the ionic type. For example, when the pH of the malt alcohol beverage is to be raised, various ion-exchange resins of which the ionic type is $OH^-$ may be used. On the other hand, when the pH is to be lowered, the ionic type of $Cl^-$ or sulfuric acid may be used. Alternatively, ion-exchange resins of plural ionic types may be combined for use.

The aforementioned synthetic adsorbents may be largely classified into the aromatic type, the substituted aromatic type, and the acrylic type based on their chemical structures. Synthetic adsorbents of the aromatic type, for example, include HP20, HP21, SP825, SP850, SP70, SP700 (all available from Mitsubishi Chemical Corporation), XAD2 and XAD4 (all available from Organo Corporation). Synthetic adsorbents of the substituted aromatic type, for example, include SP207 (available from Mitsubishi Chemical Corporation). Synthetic adsorbents of the acrylic type include HP1MG, HP2MG (all available from Mitsubishi Chemical Corporation), XAD7 (available from Organo Corporation). Among these HP20, SP825, XAD2, XAD4, SP207, HP1MG and XAD7 are preferably used.

In the process of producing a malt alcohol beverage, the aforementioned adsorbent may be used alone or a plural number of adsorbents may be used in combination.

In the method of producing a malt alcohol beverage according to this invention, the rough flavor components that are removed through adsorption include causative substances for stale flavor, precursor substances thereof, or organic acids.

The causative substances for stale flavor, for example, include carbonyl compounds and Maillard compounds. These reaction intermediates and final reaction products are also included in the causative substances for stale flavor. Concrete examples of carbonyl compounds, for example, include propanal, hexanal, hexenal, pentanal, furfural, trans-2-nonenal and phenylacetaldehyde. Concrete examples of Maillard compounds, for example, include 5-hydroxymethylfurfural and Amadori substances, precursor thereof, which are the reaction products of sugars (such as glucose and fructose) and amino acids. The Amadori substances, for example, include glucose-glycine, glucose-alanine, glucose-leucine, glucose-isoleucine, fructose-proline, fructose-glutamic acid, fructose-serine, and fructose-threonine. Further included are heterocyclic compounds having a pyrazine ring, pyrrole ring, or imidazole ring such as pyrazine, 2-methylpyrazine, 2,5-dimethylpyrazine, 2,3-dimethylpyrazine, and trimethylpyrazine, for which the Maillard reaction has progressed. Still further as causative substances that yield stale flavor other than the substances mentioned above there are mentioned the causative substances for stale flavor that are resulted from the decomposition of unsaturated fatty acids. Here, by selectively removing not only the causative substances for stale flavor but also precursors thereof (such as unsaturated fatty acids) through adsorption, it will be possible to suppress the formation of their decomposed products and to reduce the stale flavor.

The aforementioned organic acids are substances that produce sourness and rough flavors by being present in the malt alcohol beverage. Specifically there are mentioned pyroglutamic acid, acetic acid, lactic acid, succinic acid, malic acid, pyruvic acid, citric acid, fumaric acid and isocitric acid.

A majority of the causative substances for stale flavor including the unsaturated fatty acids mentioned above are highly hydrophobic substances. Such hydrophobic substances are removed through adsorption by the adsorbents mentioned above, which allows the causative substances for stale flavor to be effectively eliminated.

In contrast, the substances that are essential to the flavor of a malt alcohol beverage and that should remain in the malt alcohol beverage without being adsorbed by the adsorbents of this invention include, for example, iso-α acid and reduced iso-α acid. Iso-α acid is a substance that produce bitterness in the malt alcohol beverage, and its degree of bitterness is expressed in terms of BU unit or the content of iso-α acid (mg/l): the former bitterness unit is quantified by measuring absorbance at 275 nm after addition of 6N hydrochloric acid solution to the malt alcohol beverage and extraction with isooctane; and the latter is measured by HPLC according to the method of BCOJ (Brewery Convention of Japan) or ASBC (American Society of Brewing Chemists). Because iso-α acid has high hydrophobicity, it tends to be adsorbed by the adsorbent. The amount of iso-α acid adsorbed to the adsorbent of this invention is determined and the resin with a small amount of adsorption is selected. Thus, it is possible to select the type of adsorbent suitable to the method of producing a malt alcohol beverage according to this invention. Specifically, after rough flavor components are removed through adsorption using an adsorbent, the decrease in BU for the malt alcohol beverage is preferably 0–50% and more preferably 5–30%. In order to have the lowered BU value returned and to have the lost hop flavor regained both of which are caused by adsorptive treatment with the adsorbent, iso-α acid, iso-hop extract, or its equivalent may be added during the production of the malt alcohol beverage, or alternatively iso-α acid, iso-hop extract, or its equivalent may be added prior to the adsorptive treatment in consideration of the BU value to be decreased and the lost hop flavor resulting from adsorption.

There will be next described the method for measuring the contents of various components, including the rough flavor components, that are present in the malt alcohol beverage in accordance with this invention. Measurement of various components, including the rough flavor components, that are present in the malt alcohol beverage is not only essential to the investigation of conditions under which the adsorbents of this invention are determined, but also is an essential means for the quality control of the malt alcohol beverage that has undergone removal of the rough flavor components by adsorption with the aid of the adsorbent.

For a device or method for measuring various components including the rough flavor components, HPLC or gas chromatography (GC) may, for example, be used. When the adsorbed amount of the substance described above is determined using HPLC, the malt alcohol beverage may be used as a sample and water/acetonitrile as a mobile phase to effect detection at 280 nm UV. When an ODS (silica gel bound with octadecyl groups) column is used as the filler, the peaks appeared resulting from elution often contain highly hydrophilic substances in the first half and highly hydrophobic substances in the second half. When the contents of the causative substances for stale flavor are to be measured, hydrophobic peaks should be caught attention and may be measured. When gas chromatography is used to measure the adsorbed amounts described above, the malt alcohol beverage may be used as a sample, and after extraction with organic solvents such as ether-pentane or solid-phase extraction, measurement can be made using conventional techniques. In any measurement described above, these substances in the sample may be directly or chemically modified as necessary, after which measurement may be made.

The methods described above are used to determine the presence or absence of or the contents of the substances that influence the flavor of the malt alcohol beverage. This makes it possible to appropriately select an adsorbent capable of selectively removing the rough flavor components as well as to find the adequate amount of the adsorbent to be added to the malt alcohol beverage. Accordingly, by using the adsorbent selected by the aforementioned method, it will be possible to remove only the rough flavor components and to produce the malt alcoholic beverage that has excellent flavor and that can maintain the flavor immediately after production over a prolonged period of time.

EXAMPLES

This invention will be described in further detail by way of examples hereunder; however, the invention should not be limited to these examples.

Examples 1–70 and Comparative Examples 1–14

Three hundred milliliters of malt alcohol beverages (two types: low-malt beer and beer), from which $CO_2$ had been removed by ultrasonication, was transferred to 500 ml-beakers for preparation. To the respective beverages was added ion-exchange resins or synthetic adsorbents that had been filtered through an extensively washed glass filter at amounts of addition indicated below and the pH of the malt alcohol beverage was measured with time at stirring. With respect to HPLC peak, the content of iso-α acid, the content of organic acid, and the content of total polyphenol, measurement was made with the malt alcohol beverages that had been stirred for 3 hours. Here, iso-α acid was analyzed using HPLC and total polyphenol was analyzed according to the BCOJ method (ammonium iron (III) citrate, carbozinmethylcellulose, ethylenediaminetetraacetic acid and ammonia water were added to develop color, after which the measurement was done at 600 nm). All the manipulations above were conducted at room temperature.

Ion-exchange Resins

The ion-exchange resins used are shown in Table 1.

TABLE 1

|  | WA10 | WA20 | WA30 | IR67 | IRA96SB | XE583 |
|---|---|---|---|---|---|---|
| feature | acrylic type gel type | styrene type porous type | styrene type hyperporous type | acrylic type gel type | styrene type | styrene type |
|  | white transparent spherical | light yellow opaque spherical | light yellow opaque spherical | white tansparent spherical | light yellow opaque spherical | light yellow opaque spherical |
| water content | 63–69 | 39–45 | 43–55 | 56–62 | 56–62 | 48–54 |
| exchange capacity (meq/ml) | 1.2 or more | 2.5 or more | 1.5 or more | 1.6 | 1.2 | 1.5 |

The ion-exchange resins used and the amounts of their addition are shown below.

| examples | resin name | amount of addition (g/100 ml) |
|---|---|---|
| 1, 13, 25, 37 | WA10 | 0.2 |
| 2, 14, 26, 38 | WA10 | 1 |
| 3, 15, 27, 39 | WA20 | 0.2 |
| 4, 16, 28, 40 | WA20 | 1 |
| 5, 17, 29, 41 | WA30 | 0.2 |
| 6, 18, 30, 42 | WA30 | 1 |
| 7, 19, 31, 43 | IRA67 | 0.2 |
| 8, 20, 32, 44 | IRA67 | 1 |
| 9, 21, 33, 45 | IRA96SB | 0.2 |
| 10, 22, 34, 46 | IRA96SB | 1 |
| 11, 23, 35, 47 | IRAXE583 | 0.2 |
| 12, 24, 36, 48 | IRAXE583 | 1 |

Here, the resins were washed with distilled water, then with 1N—HCl, distilled water, and 1N—NaOH in this order, and they were washed with distilled water until they turned neutral, by which they were made a Cl⁻ type or a OH⁻ type. In addition, WA10, WA20, and WA30 were available from Mitsubishi Chemical Corporation and IRA67, IRA96SB and IRAXE583 were available from Organo Corporation.

The ion types of the ion-exchange resins and the samples used in Example 1 to 48 are as follows:

Examples 1–12: Ion-exchange resin of which the ion type is OH⁻ and low-malt beer Examples 13–24: Ion-exchange resin of which the ion type is Cl⁻ and low-malt beer Examples 25–36: Ion-exchange resin of which the ion type is OH⁻ and beer Examples 37–48: Ion-exchange resin of which the ion type is Cl⁻ and beer Variations in the pH of the malt alcohol beverages after treatment with ion-exchange resins are shown in FIGS. 1–4. The results from Examples 1–6 are shown in FIG. 1A, the results from Examples 7–12 in FIG. 1B, the results from Examples 13–18 in FIG. 2A, the results from Examples 19–24 in FIG. 2B, the results from Examples 25–30 in FIG. 3A, the results from Examples 31–36 in FIG. 3B, the results from Examples 37–42 in FIG. 4A, and the results from Examples 43–48 in FIG. 4B. In the figures IAXE583 is indicated as "IRAXE," and the amount of addition for an ion-exchange resin (g/100 ml) is shown in the bracket.

Consequently, when the ion type of an ion-exchange resin was OH⁻, the pH of the treated malt alcohol beverage increased; whereas the pH decreased when the ion type was Cl⁻.

FIGS. 5–12 graphically show the sum of peak areas when the components of a malt alcohol beverage were detected by HPLC after treatment with ion-exchange resins. With respect to the peaks appeared resulting from elution, it was likely that there were obtained those of hydrophilic components in the first half of elution and there were obtained those of hydrophobic components in the second half of elution. Graphic representation was made such that the first half portions of elution are hydrophilic peaks and the second half portions of elution are hydrophobic peaks.

Figure 5A:
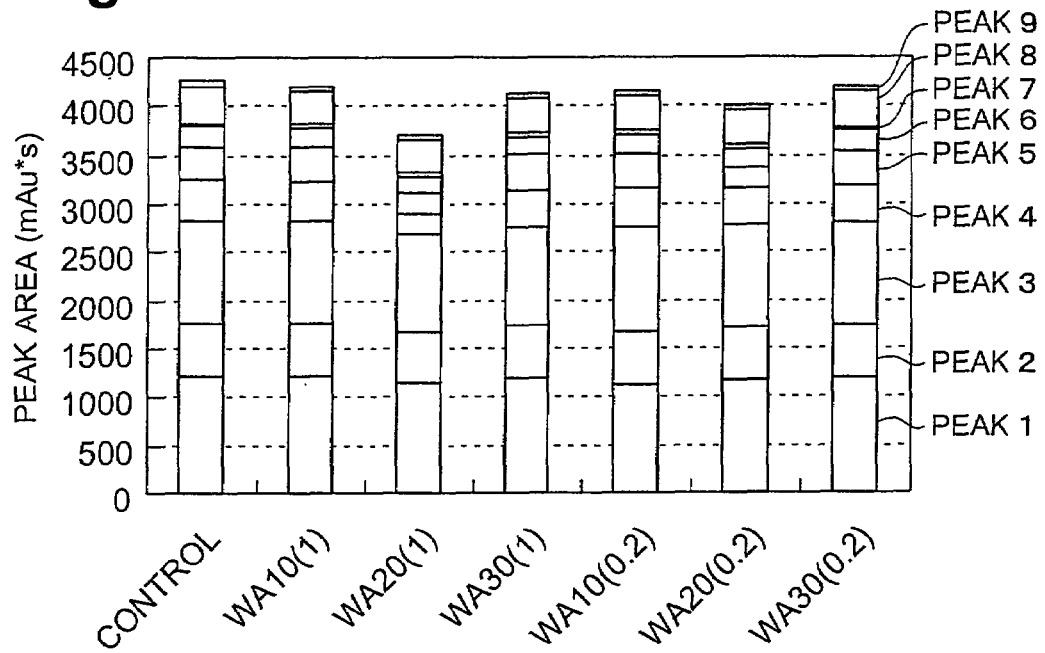
FIG. 5A is a graph showing the sum of hydrophilic peaks as detected by HPLC when ion-exchange resins were added to the low-malt beer.
Figure 5B:
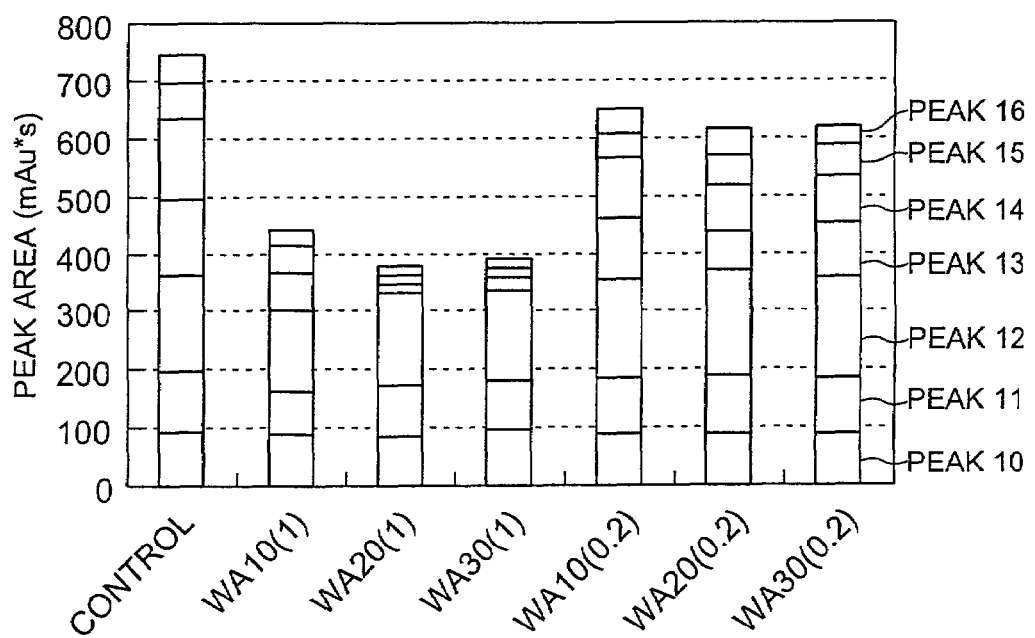
FIG. 5B is a graph showing the sum of hydrophobic peaks as detected by HPLC when the ion-exchange resins were added to the low-malt beer.
Figure 6A:
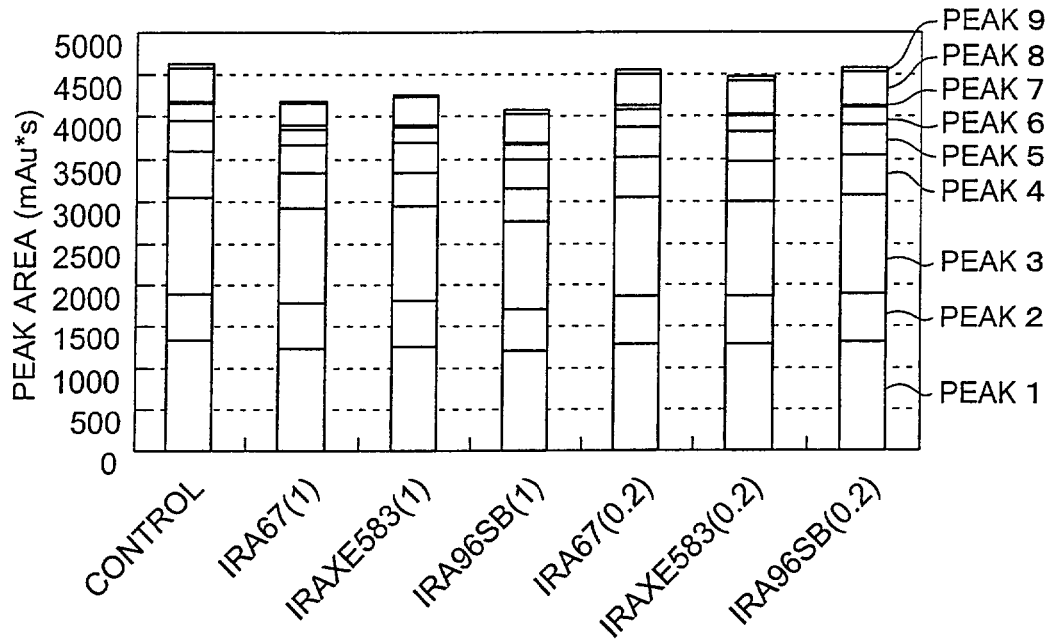
FIG. 6A is a graph showing the sum of hydrophilic peaks as detected by HPLC when the ion-exchange resins were added to the low-malt beer.
Figure 6B:
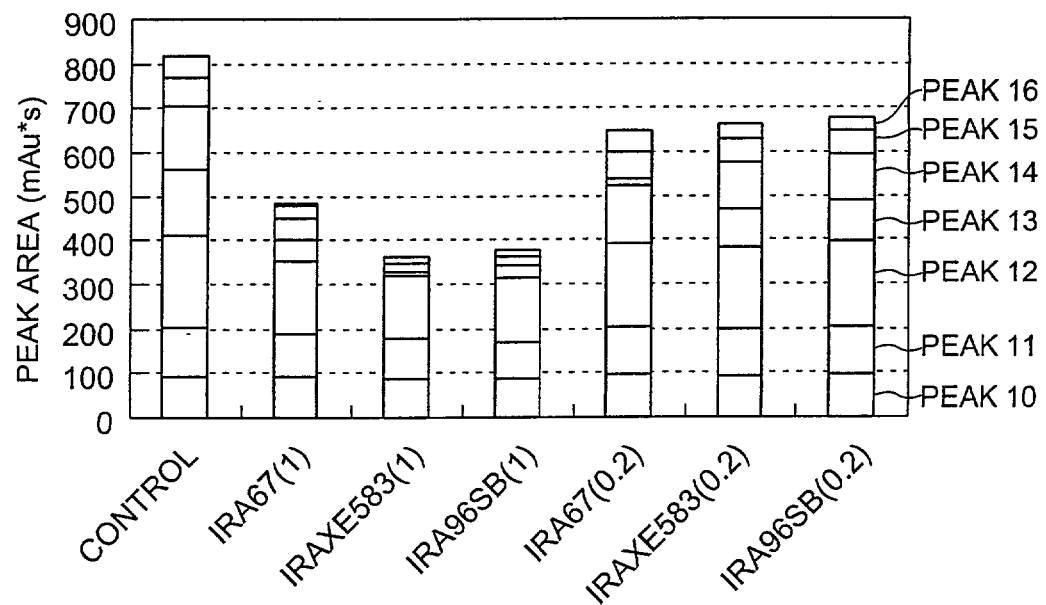
FIG. 6B is a graph showing the sum of hydrophobic peaks as detected by HPLC when the ion-exchange resins were added to the low-malt beer.
Figure 7A:
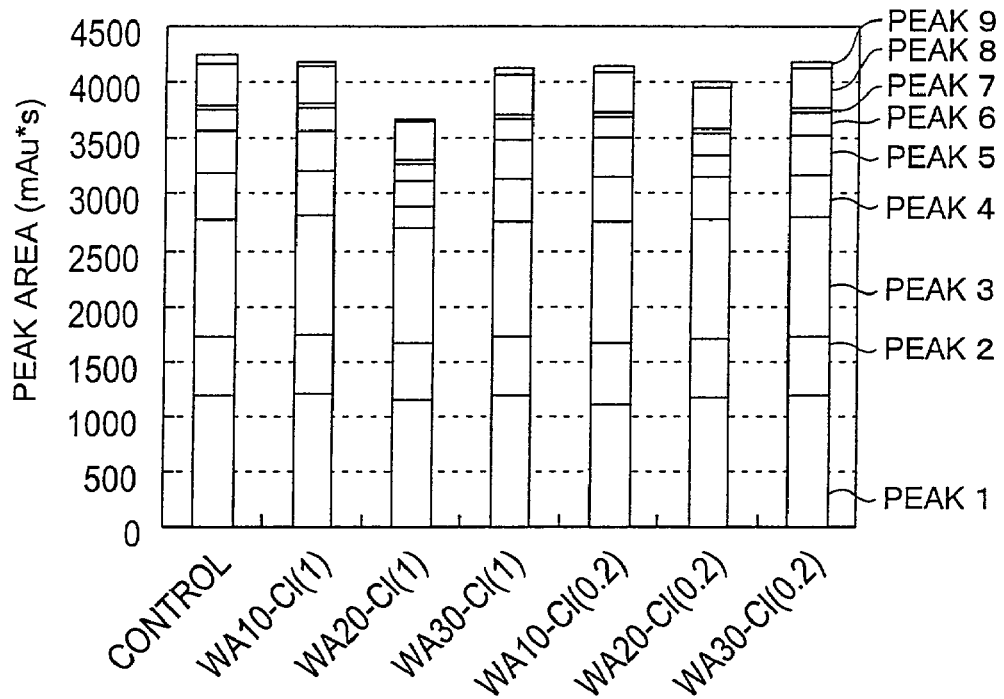
FIG. 7A is a graph showing the sum of hydrophilic peaks as detected by HPLC when ion-exchange resins were added to the low-malt beer.
Figure 7B:
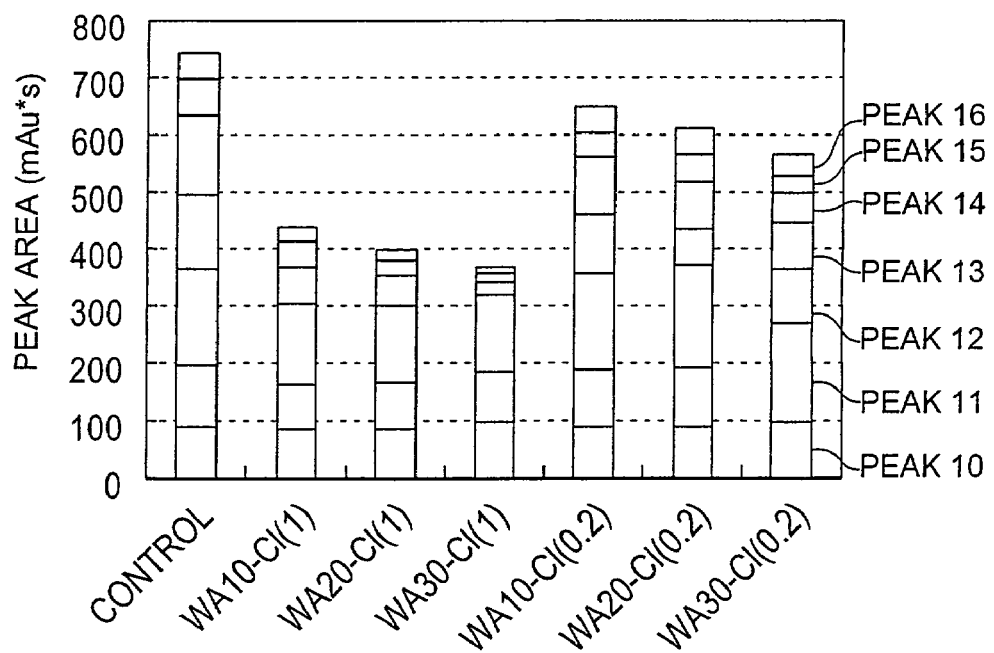
FIG. 7B is a graph showing the sum of hydrophobic peaks as detected by HPLC when the ion-exchange resins were added to the low-malt beer.
Figure 8A:
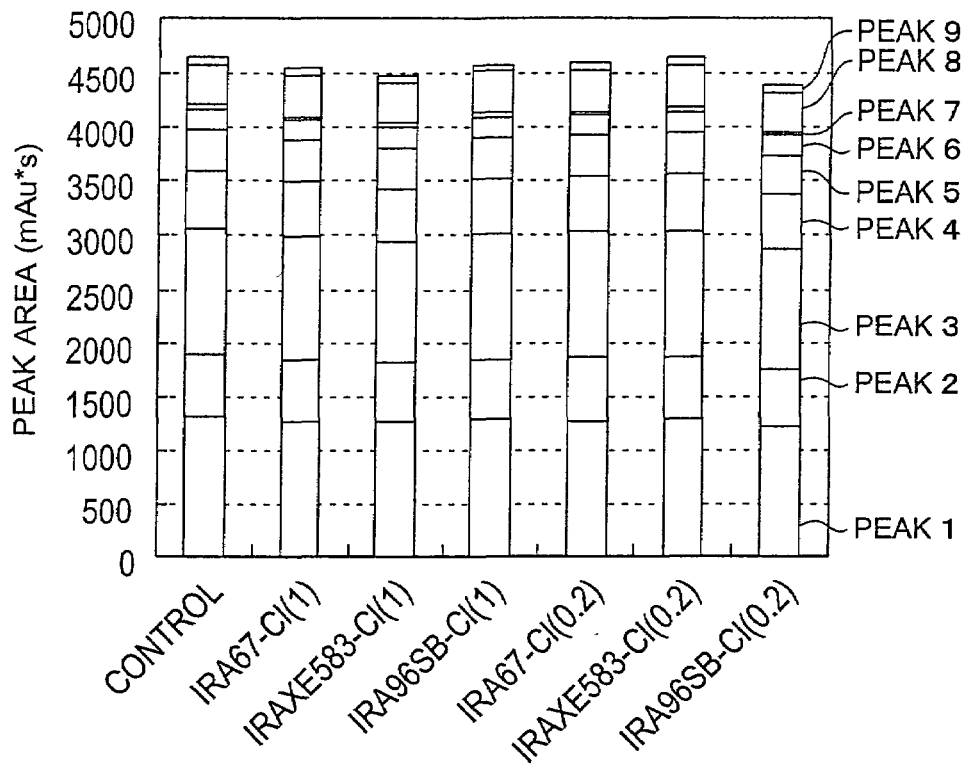
FIG. 8A is a graph showing the sum of hydrophilic peaks as detected by HPLC when ion-exchange resins were added to the low-malt beer.
Figure 8B:
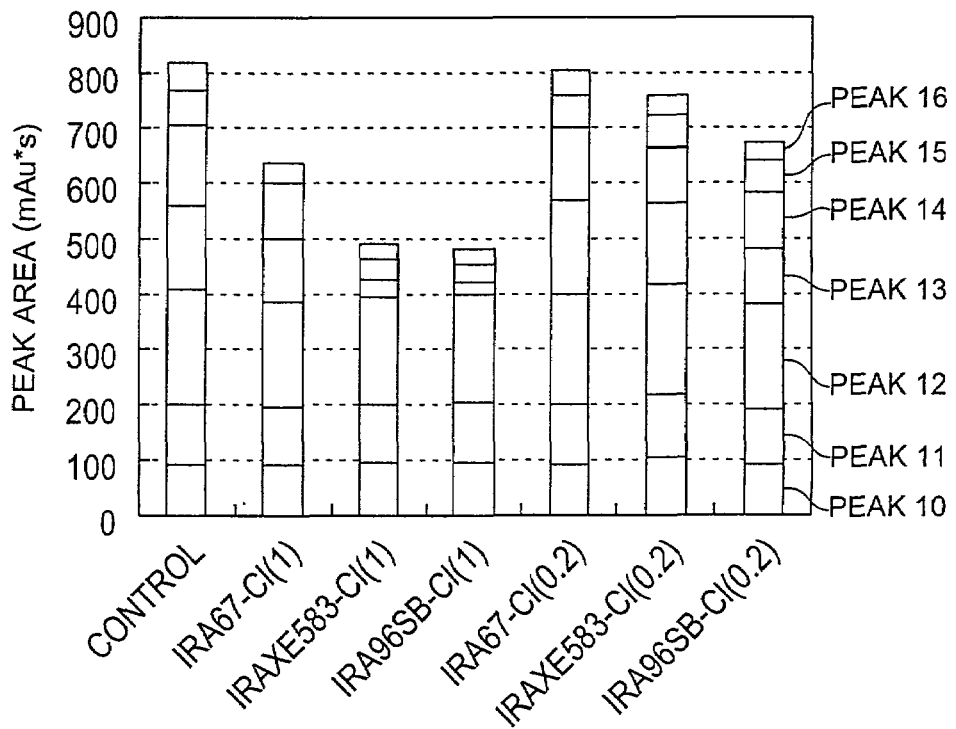
FIG. 8B is a graph showing the sum of hydrophobic peaks as detected by HPLC when the ion-exchange resins were added to the low-malt beer.
Figure 9A:
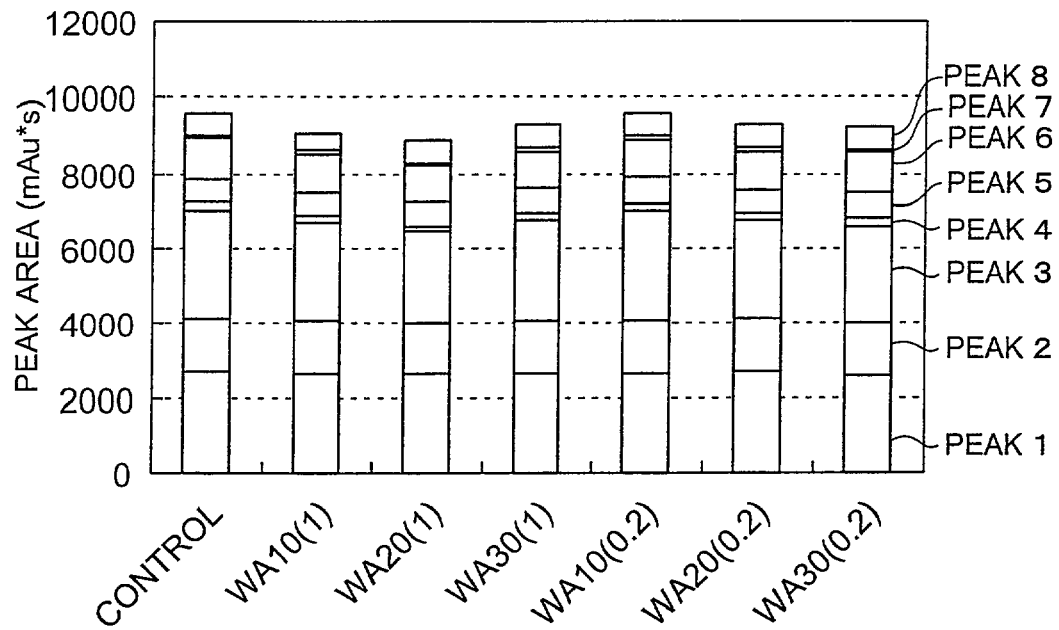
FIG. 9A is a graph showing the sum of hydrophilic peaks as detected by HPLC when the ion-exchange resins were added to the beer.
Figure 9B:
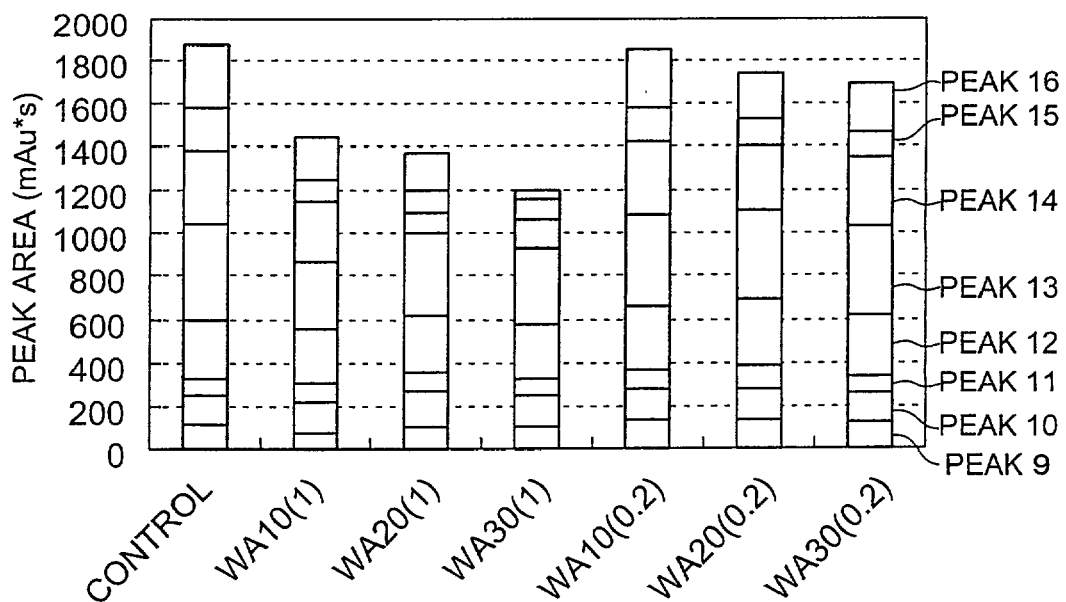
FIG. 9B is a graph showing the sum of hydrophobic peaks as detected by HPLC when the ion-exchange resins were added to the beer.
Figure 10A:
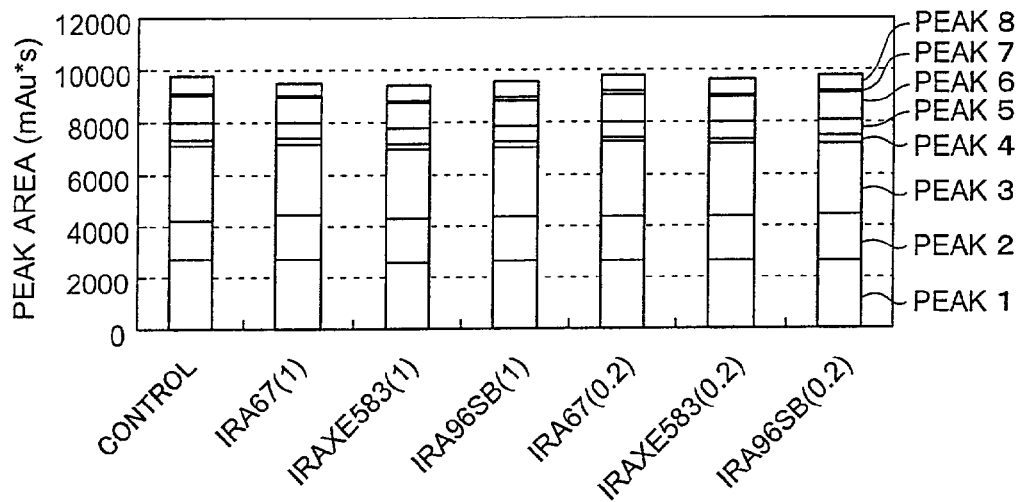
FIG. 10A is a graph showing the sum of hydrophilic peaks as detected by HPLC when the ion-exchange resins were added to the beer.
Figure 10B:
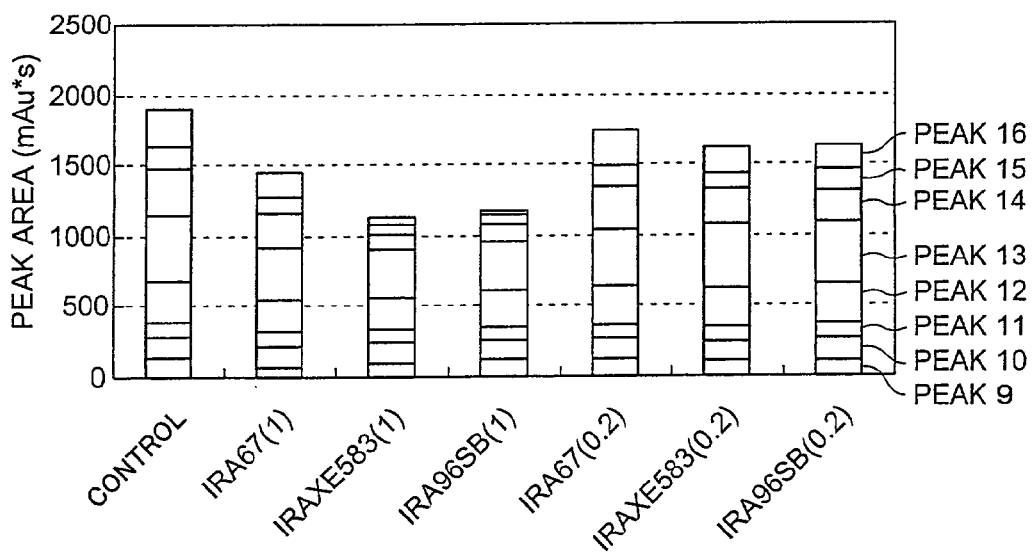
FIG. 10B is a graph showing the sum of hydrophobic peaks as detected by HPLC when the ion-exchange resins were added to the beer.
Figure 11A:
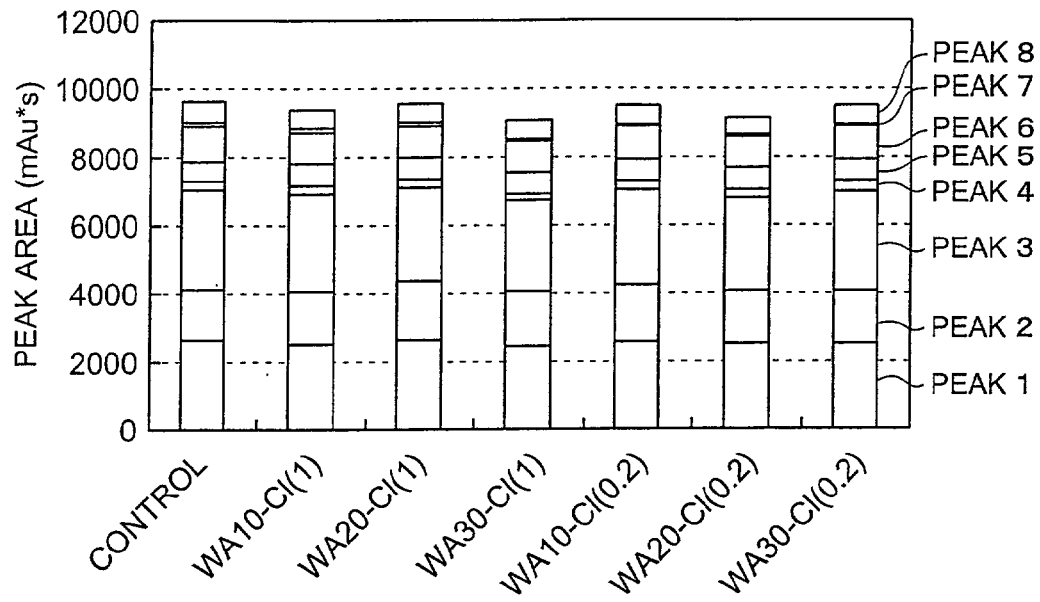
FIG. 11A is a graph showing the sum of hydrophilic peaks as detected by HPLC when the ion-exchange resins were added to the beer.
Figure 11B:
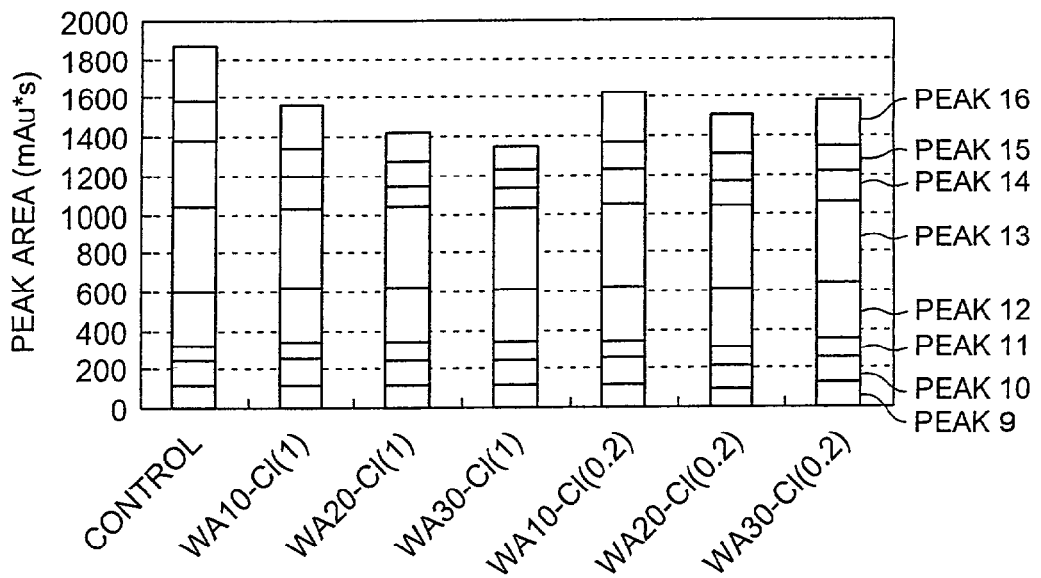
FIG. 11B is a graph showing the sum of hydrophobic peaks as detected by HPLC when the ion-exchange resins were added to the beer.
Figure 12A:
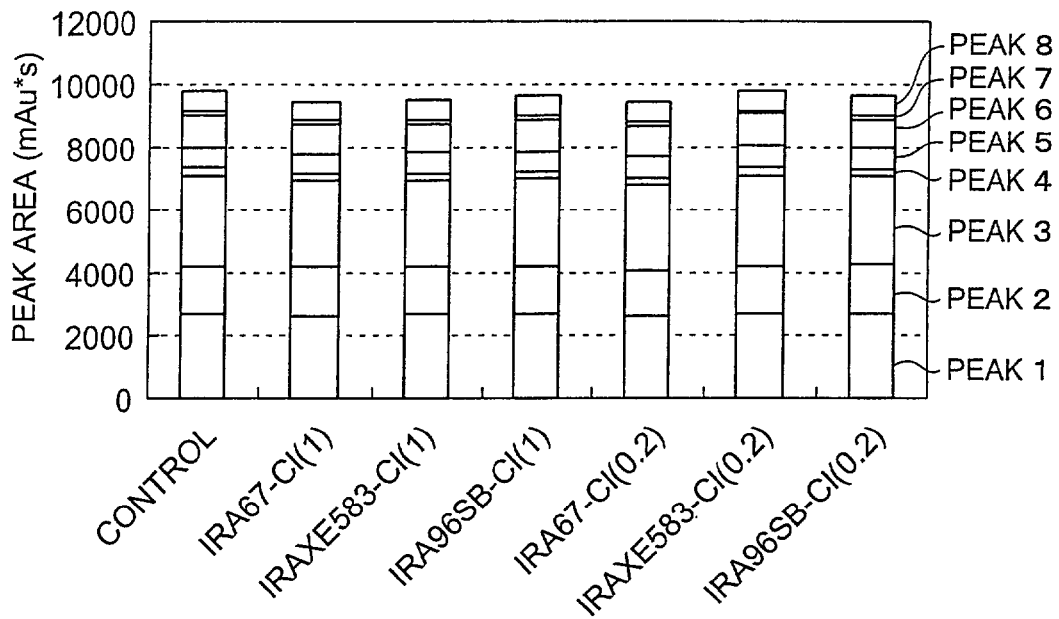
FIG. 12A is a graph showing the sum of hydrophilic peaks as detected by HPLC when the ion-exchange resins were added to the beer.
Figure 12B:
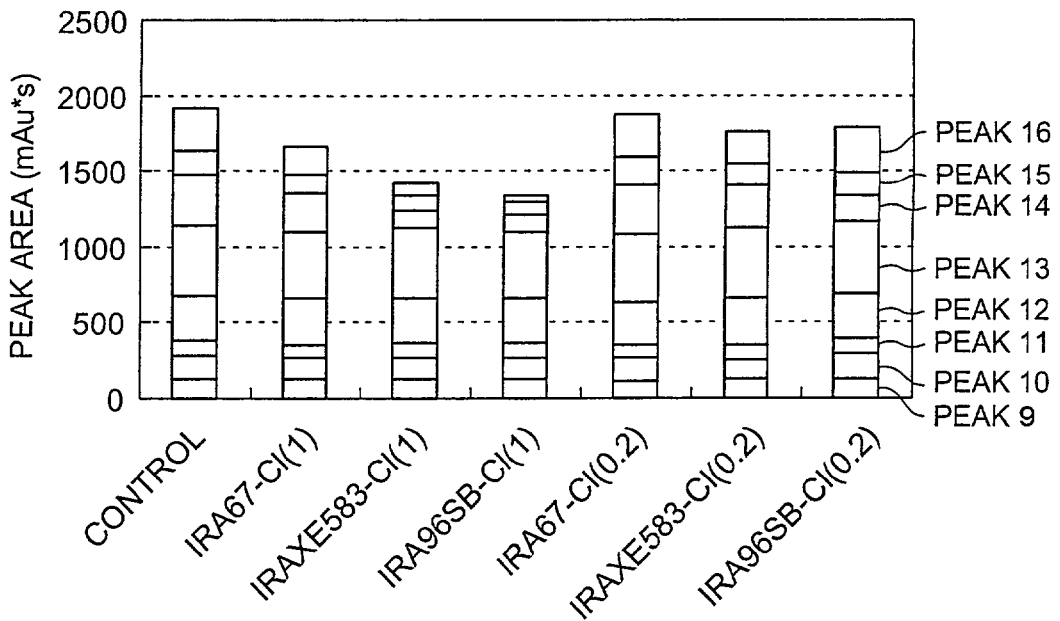
FIG. 12B is a graph showing the sum of hydrophobic peaks as detected by HPLC when the ion-exchange resins were added to the beer.

The hydrophilic peaks from Examples 1–6 and the control (Comparative Example 1) are shown in FIG. 5A; the hydrophobic peaks from Examples 1–6 and the control (Comparative Example 1) are shown in FIG. 5B. The hydrophilic peaks from Examples 7–12 and the control (Comparative Example 2) are shown in FIG. 6A; the hydrophobic peaks from Examples 7–12 and the control (Comparative Example 2) are shown in FIG. 6B. The hydrophilic peaks from Examples 13–18 and the control (Comparative Example 5) are shown in FIG. 7A; the hydrophobic peaks from Examples 13–18 and the control (Comparative Example 5) are shown in FIG. 7B. The hydrophilic peaks from Examples 19–24 and the control (Comparative Example 6) are shown in FIG. 8A; the hydrophobic peaks from Examples 19–24 and the control (Comparative Example 6) are shown in FIG. 8B. The hydrophilic peaks from Examples 25–30 and the control (Comparative Example 5) are shown in FIG. 9A; the hydrophobic peaks from Examples 25–30 and the control (Comparative Example 5) are shown in FIG. 9B. The hydrophilic peaks from Examples 31–36 and the control (Comparative Example 6) are shown in FIG. 10A; the hydrophobic peaks from Examples 31–36 and the control (Comparative Example 6) are shown in FIG. 10B. The hydrophilic peaks from Examples 37–42 and the control (Comparative Example 7) are shown in FIG. 11A; the hydrophobic peaks from Examples 37–42 and the control (Comparative Example 7) are shown in FIG. 11B. The hydrophilic peaks from Examples 43–48 and the control (Comparative Example 8) are shown in FIG. 12A; the hydrophobic peaks from Examples 43–48 and the control (Comparative Example 8) are shown in FIG. 12B. In the figures peak area is indicated as "mAu*S" and the amount of addition for an ion-exchange resin (g/100 ml) is shown in the bracket.

Consequently, it has been confirmed that hydrophobic components are adsorbed on the ion-exchange resin. It has also been confirmed that when WA30, IRA96SB or IRAXE583 is used, there is a greater amount of adsorbed components and that the more the amount of addition for an adsorbent is, the higher the effect of adsorption becomes.

Figure 16A:
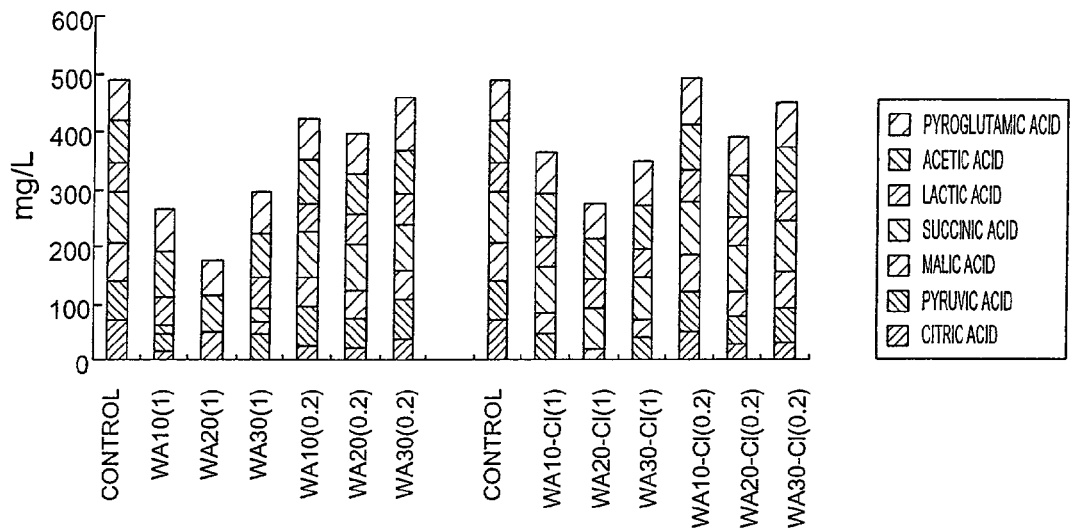
FIG. 16A is a graph showing the contents of organic acids in the low-malt beer when ion-exchange resins were added to the low-malt beer.
Figure 16B:
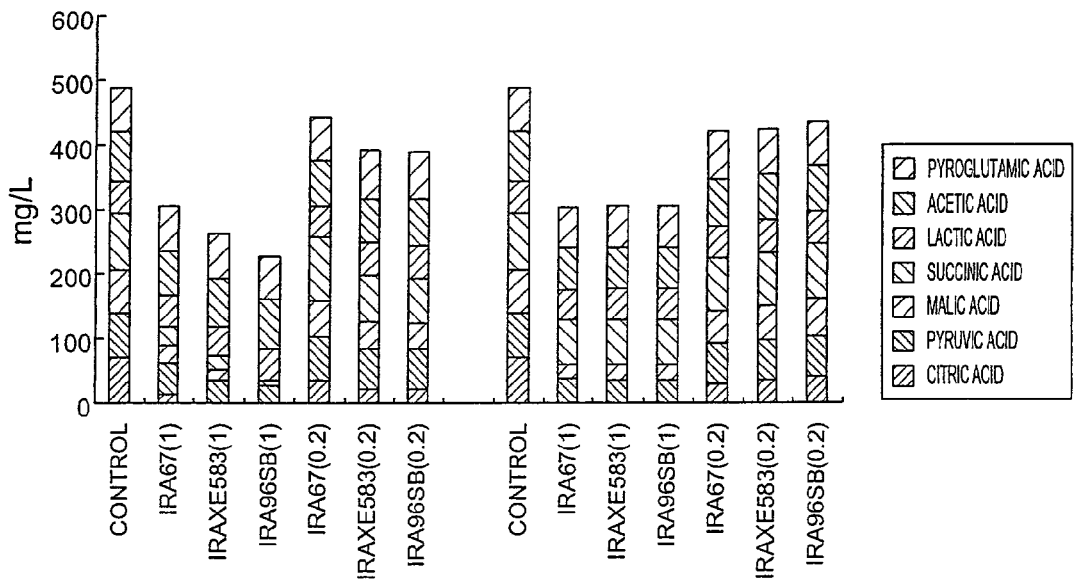
FIG. 16B is a graph showing the contents of organic acids in the low-malt beer when ion-exchange resins were added to the low-malt beer.
Figure 17A:
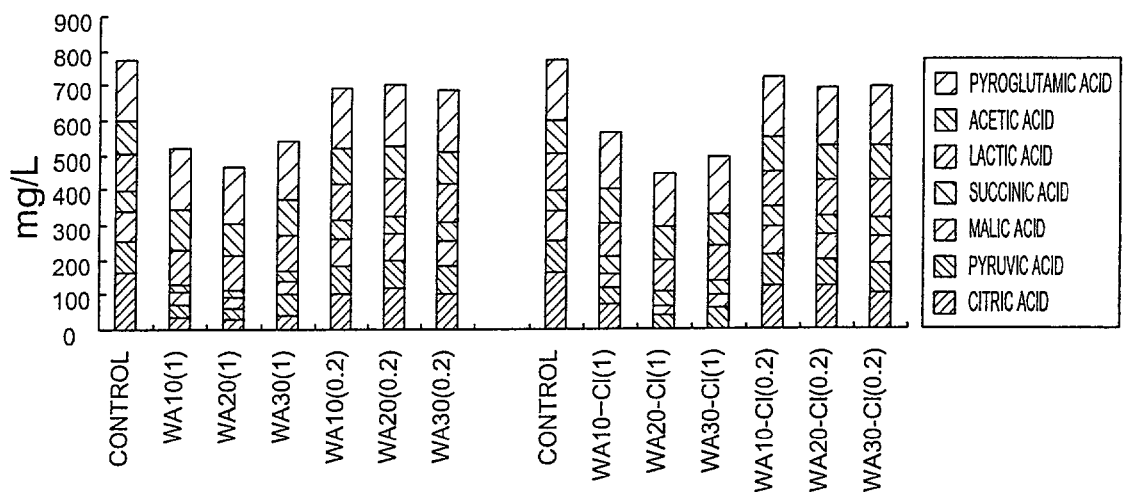
FIG. 17A is a graph showing the contents of organic acids in the beer wine when the ion-exchange resins were added to the beer.
Figure 17B:
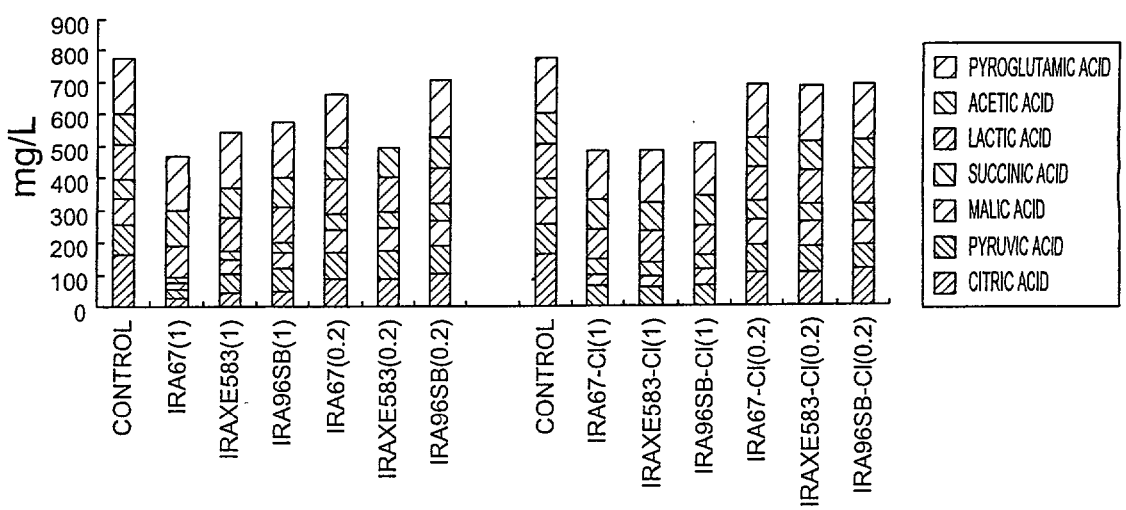
FIG. 17B is a graph showing the contents of organic acids in the beer when the ion-exchange resins were added to the beer.

Furthermore, the contents of organic acids in malt alcohol beverages after treatment with ion-exchange resins are shown in FIGS. 16–17. Examples 1–6, 13–18 and the control (Comparative Examples 1 and 3) are shown in FIG. 16A; Examples 7–12, 19–24 and the control (Comparative Examples 2 and 4) are shown in FIG. 16B. Examples 25–30, 37–42 and the control (Comparative Examples 5 and 7) are shown in FIG. 17A; Examples 31–36, 43–48 and the control (Comparative Examples 6 and 8) are shown in FIG. 17B. In FIGS. 16–17, the ion-exchange resins of which the ion type is Cl⁻ are indicated as "the name of resin-Cl," while the ion-exchange resins of which the ion type is OH⁻ are indicated only in terms of their names. In the figures, the amount of addition for an ion-exchange resin (g/100 ml) is shown in the bracket.

Various organic acids were adsorbed on the resin the ion type of which was either OH⁻ or Cl⁻; among those citric acid tended to be adsorbed to the greatest extent, and either of acetic acid and pyroglutamic acid was hardly adsorbed.

Figure 18A:
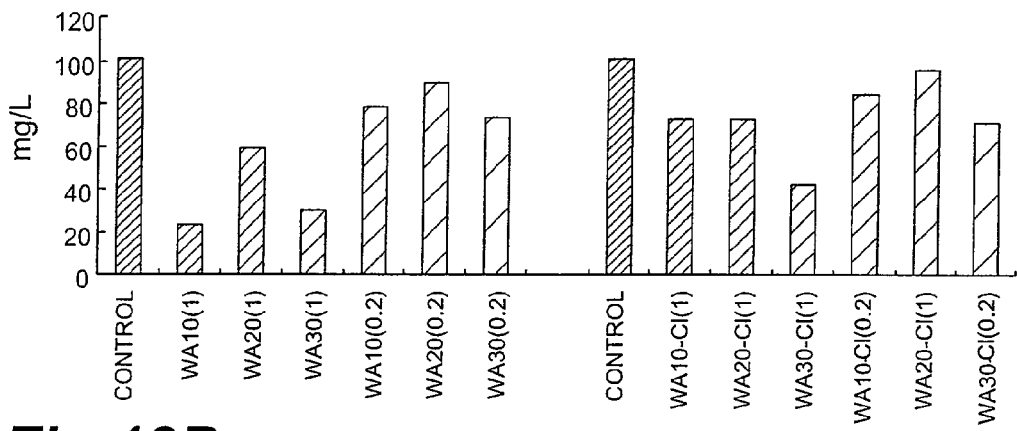
FIG. 18A is a graph showing the contents of polyphenols in the low-malt beer when the ion-exchange resins were added to the low-malt beer.
Figure 18B:
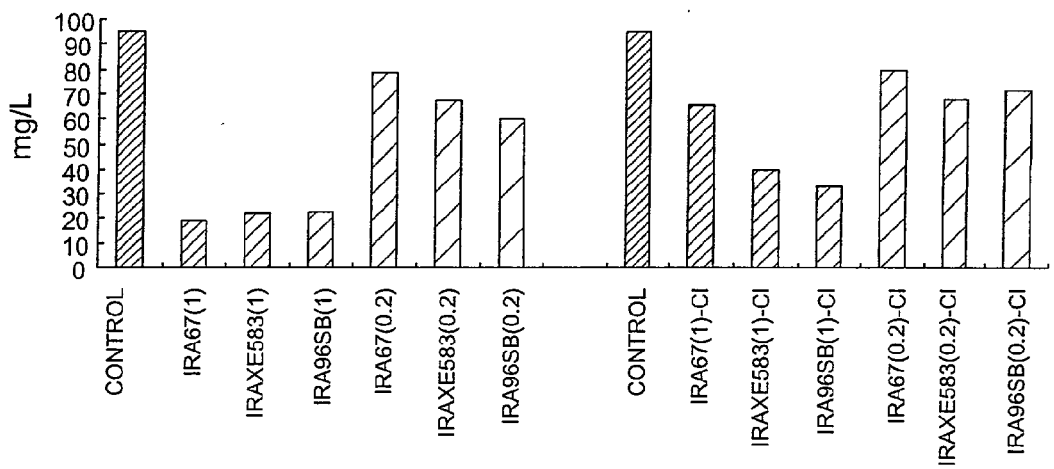
FIG. 18B is a graph showing the contents of polyphenols in the low-malt beer when the ion-exchange resins were added to the low-malt beer.
Figure 18C:
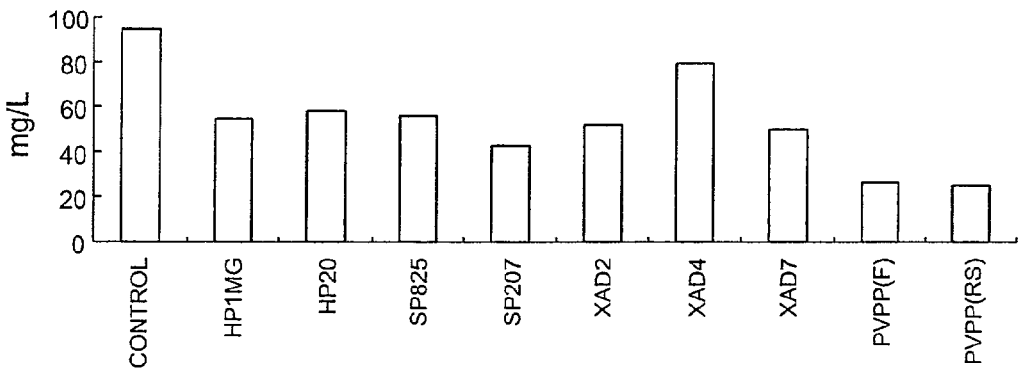
FIG. 18C is a graph showing the contents of polyphenols in the low-malt beer when synthetic adsorbents were added to the low-malt beer.
Figure 19A:
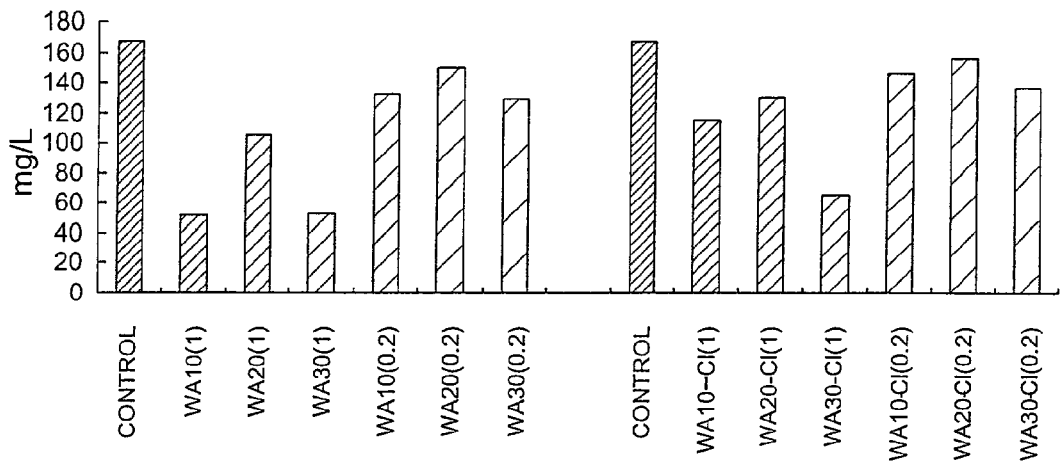
FIG. 19A is a graph showing the content of polyphenols in the low-malt beer when the ion-exchange resins were added to the beer.
Figure 19B:
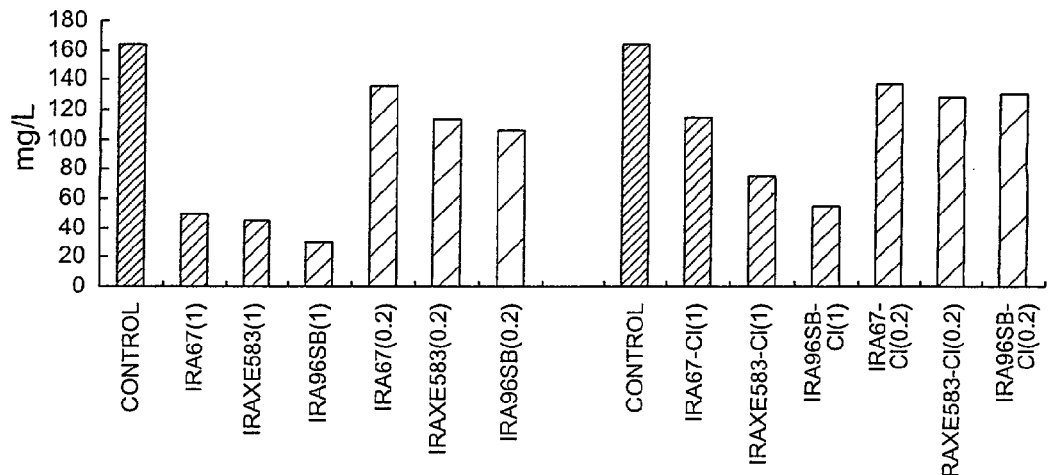
FIG. 19B is a graph showing the contents of polyphenols in the low-malt beer when the ion-exchange resins were added to the beer.

The contents of polyphenols in malt alcohol beverages after treatment with ion-exchange resins are shown in FIGS. 18–19. Examples 1–6, 13–18 and the control (Comparative Examples 1 and 3) are shown in FIG. 18A; Examples 7–12, 19–24 and the control (Comparative Examples 2 and 4) are shown in FIG. 18B. Examples 25–30, 37–42 and the control (Comparative Examples 7 and 9) are shown in FIG. 19A; Examples 31–36, 43–48 and the control (Comparative Examples 8 and 10) are shown in FIG. 19B. In each figure, the amount of addition for an ion-exchange resin (g/100 ml) is shown in the bracket.

Consequently, it has been confirmed that when WA30, IRA96SB or IRAXE583 is used, polyphenols tend to be adsorbed.

Synthetic Adsorbents

The synthetic adsorbents used are shown in Tables 2 and 3.

TABLE 2

|  | HP1MG | SP207 | SB825 | HP20 |
| --- | --- | --- | --- | --- |
| material | methacrlylic type | aromatic type | styrene-divinyl-benzene type | styrene-divinyl-benzene type |
| water content | 63.0 | 50.4 | 56.1 | 56.5 |
| specific surface area (m²/g) | 333 | 627 | 977 | 511 |
| feature | High polarity | strong hydrophobicity | | |

TABLE 3

|  | XAD2 | XAD4 | XAD7 |
| --- | --- | --- | --- |
| material | styrene type | styrene type | acrylic type |
| surface area (m²/g) | 300 | 725 | 450 |
| Water content | 47 | 48 | 69 |
| mean pore diameter | 100 | 48 | 85 |
| specific surface area (m²/g) | 333 | 627 | 977 |
| feature | non-polar | non-polar | |

The synthetic adsorbents used and their amounts of addition are shown below.

| example | adsorbent | amount of addition (g/100 ml) | time of addition (h) |
| --- | --- | --- | --- |
| Examples 49, 59 | XAD2 | 1 | 1 |
| Examples 50, 60 | XAD4 | 1 | 1 |
| Examples 51, 61 | XAD4 | 0.1 | 3 |
| Examples 52, 62 | XAD7 | 1 | 1 |
| Examples 53, 63 | XAD7 | 0.1 | 3 |
| Examples 54, 64 | HP1MG | 1 | 1 |
| Examples 55, 65 | SP207 | 1 | 1 |
| Examples 56, 66 | HP20 | 1 | 1 |
| Examples 57, 67 | HP20 | 0.1 | 3 |
| Examples 58, 68 | SP825 | 1 | 1 |

Examples 49–58 show the cases where the low-malt beer was subjected to measurement, and Examples 59–68 show the cases where beer was subjected to measurement.

Figure 13A:
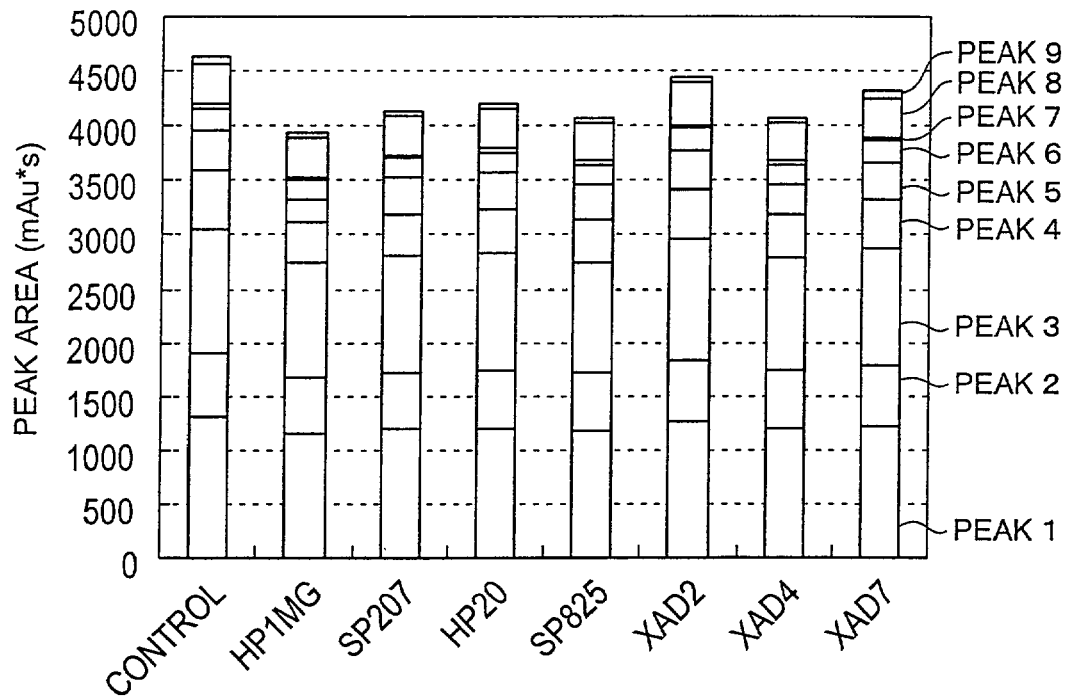
FIG. 13A is a graph showing the sum of hydrophilic peaks as detected by HPLC when a variety of synthetic adsorbents were added to the low-malt beer.
Figure 13B:
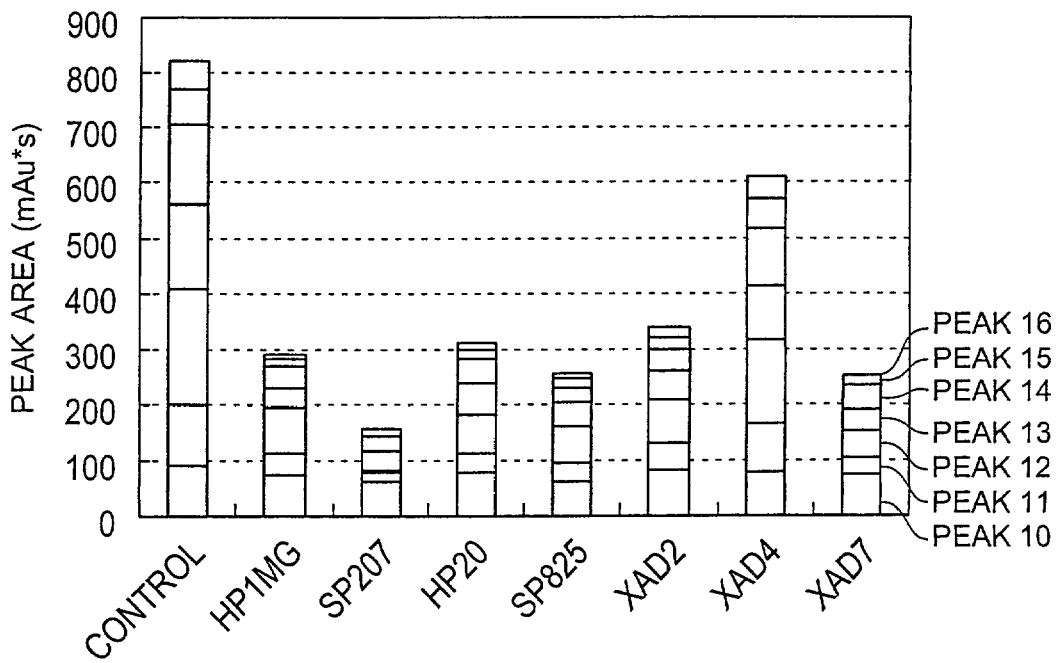
FIG. 13B is a graph showing the sum of hydrophobic peaks as detected by HPLC when the variety of synthetic adsorbents were added to the low-malt beer.
Figure 14A:
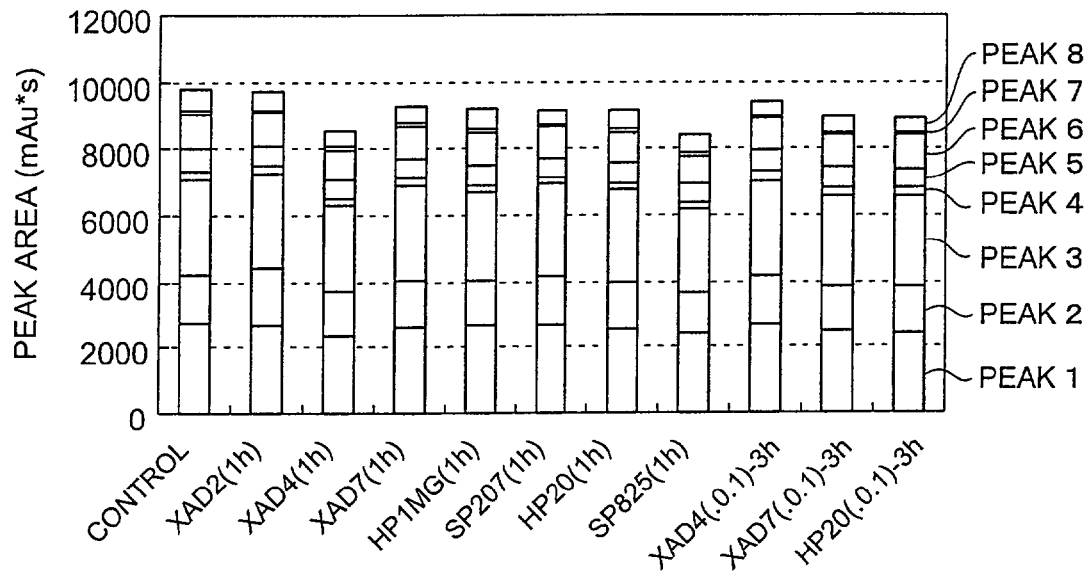
FIG. 14A is a graph showing the sum of hydrophilic peaks as detected by HPLC when a variety of synthetic adsorbents were added to the beer.
Figure 14B:
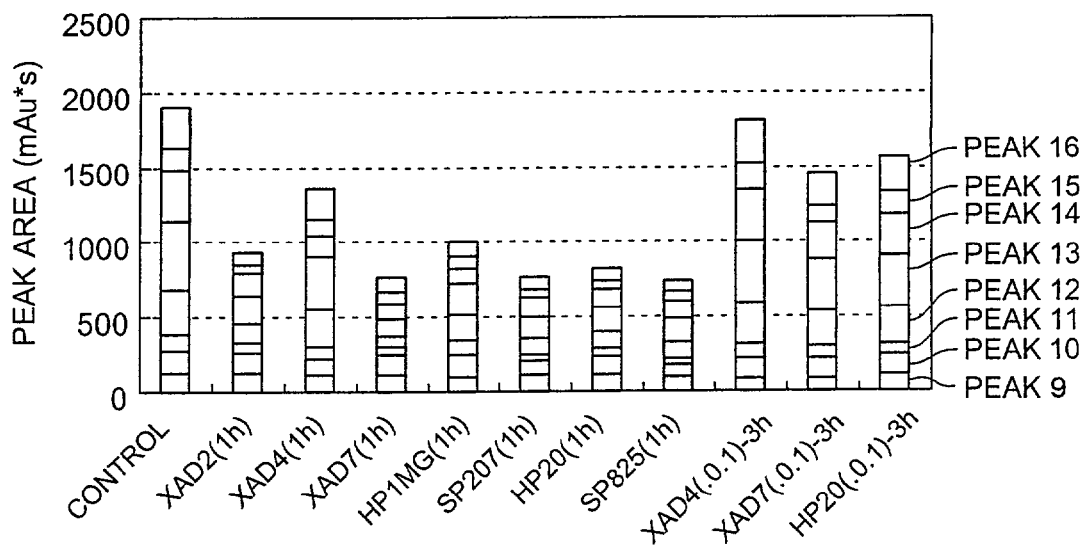
FIG. 14B is a graph showing the sum of hydrophobic peaks as detected by HPLC when the variety of synthetic adsorbents were added to the beer.

Graphic representation for the sum of peak areas as detected by HPLC is as follows. The hydrophilic peaks from Examples 49–58 and the control (Comparative Example 11) are shown in FIG. 13A; the hydrophobic peaks from Examples 49–58 and the control (Comparative Example 11) are shown in FIG. 13B. The hydrophilic peaks from Examples 59–68 and the control (Comparative Example 12) are shown in FIG. 14A; the hydrophobic peaks from Examples 59–68 and the control (Comparative Example 12) are shown in FIG. 14B. In FIG. 14, "(1h)" indicates that the time of addition for a synthetic adsorbent is one hour, and "(0.1)" indicates that the amount of addition for a synthetic adsorbent is 0.1 g/ml.

Consequently, it has been confirmed that there is a great deal of adsorption of the components in the malt alcohol beverage by SP207, SP825, XAD2, or XAD7.

Figure 15:
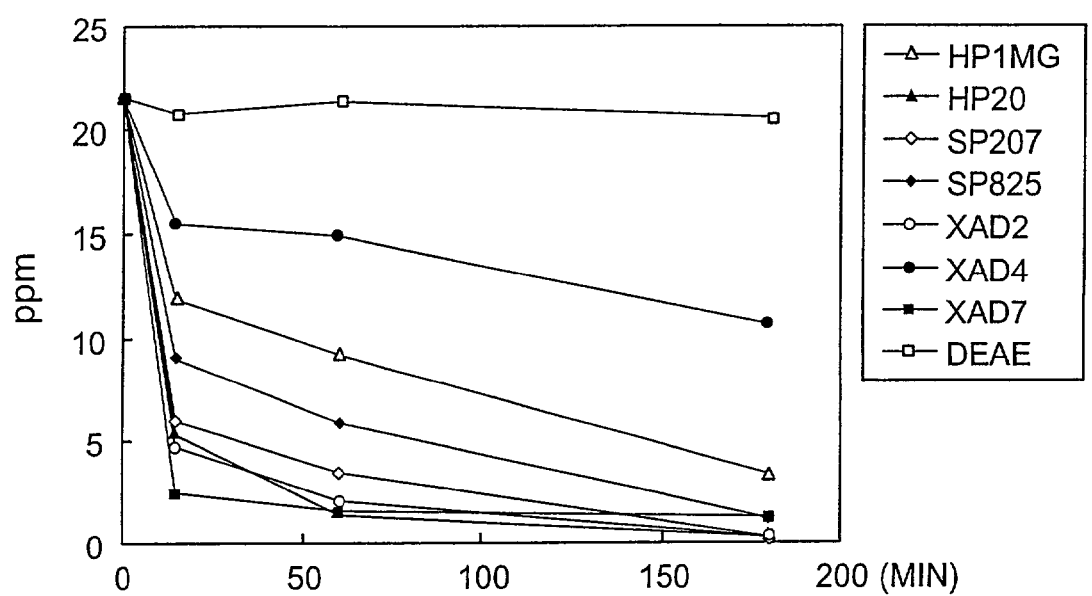
FIG. 15 is a graph showing time-dependent variations in the concentration of iso-α acid in the low-malt beer when ion-exchange resins were added to the low-malt beer.

FIG. 15 shows variations in the concentrations of iso-α acid in the malt alcohol beverages when a variety of synthetic adsorbents were added. Here, measurement was also made where DEAE was used in place of the synthetic adsorbent (Comparative Example 13).

Consequently, it has been confirmed that there is little adsorption of iso-α acid in the malt alcohol beverage when XAD4 or HP1MG is used.

Figure 19C:
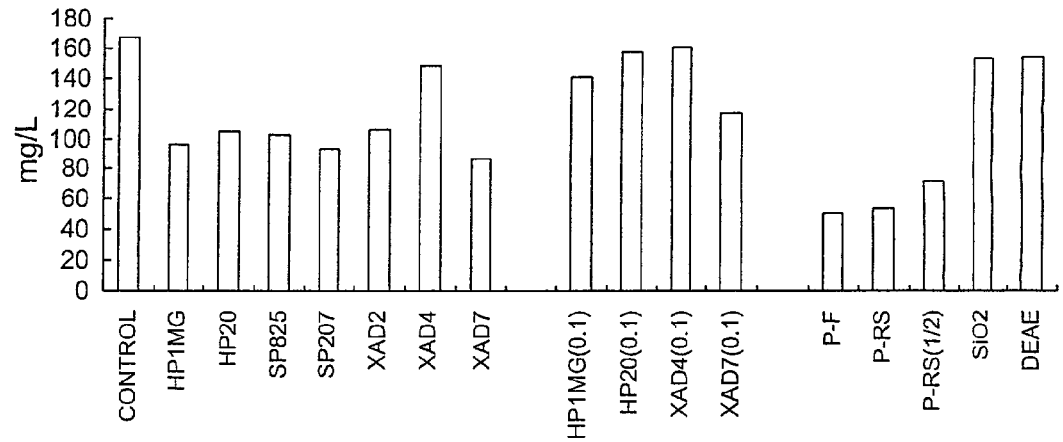
FIG. 19C is a graph showing the contents of polyphenols in the low-malt beer when the synthetic adsorbents were added to the beer.

The contents of polyphenols in the low-malt beers or beers to which various synthetic adsorbents were added are shown in FIG. 18C with respect to Examples 49–58 and the control (Comparative Example 11) and FIG. 19C with respect to Examples 59–68 and the control (Comparative Example 12). The contents of polyphenols were also measured where PVPP(F) (Example 69), PVPP(RS) (Example 70), DEAE (Comparative Example 13) and $SiO_2$ (Comparative Example 14). In the figure "( )" indicates the amount of addition for a synthetic adsorbent (g/ml).

Consequently, it has been confirmed that the power of adsorption of polyphenols by a synthetic adsorbent exhibits similar trends in the low-malt beer and the beer and that there is a great deal of adsorption of polyphenols in the malt alcohol beverage when HP1MG, HP20, SP825, SP207, XAD2, or XAD7 is used. In the cases of $SiO_2$ and DEAE, the adsorption of polyphenols was hardly observed.

Examples 71–88 and Comparative Examples 15–20

After the synthetic adsorbents were heated in sterilized water at 60° C. for 1 hour, they were filtered through a glass filter. These adsorbents were respectively added to the malt alcohol beverages (633 ml), and the space was filled with foam by knocking to remove as much oxygen as possible from the space, after which tapping was done. After they were shaken at room temperature for 2 hours, they were stored at 37° C. for 1 week and analytical and sensory evaluations were carried out. The sensory evaluation was carried out according to the profile method: the trained panel evaluated stale odor, paper odor, oxidation odor and the overall degree of aging in a sensory manner, and the data was provided for statistical analysis.

First, among the synthetic adsorbents (HP1MG, XAD4 and XAD7), HP1MG was added to the malt alcohol beverage to provide the final concentrations of 0.1 g/100 ml, 0.2 g/100 ml, and 0.4 g/100 ml; XAD4 was added to the malt alcohol beverage to provide the final concentrations of 0.2 g/100ml and 0.4 g/100 ml; and XAD7 was added to the malt alcohol beverage to provide the final concentrations of 0.1 g/100 ml, 0.2 g/100 ml, and 0.4 g/100 ml. After storing at 37° C. room temperature for 1 week, the sensory evaluation was carried out. Results are shown in Tables 4–6 (Examples 71–78 and Comparative Examples 15–17). In the tables the inside the bracket indicates the concentration of adsorbent (g/100 ml): the results are expressed in terms of a value of from 0 to 4 and the greater value represents a higher degree of stale flavor. The values were validated by examination using the Friedman calibration: in the tables "*" indicates $p<0.05$ and "**" indicates $p<0.01$.

TABLE 4

|  | Comparative Example 15 control | Example 71 HP1MG (0.1) | Example 72 HP1MG (0.2) | Example 73 HP1MG (0.4) |
| --- | --- | --- | --- | --- |
| stale odor | 2.4 | 2.5 | 1.6* | 1.9 |
| paper odor | 2.1 | 2.1 | 1.1* | 1.4 |
| oxidation odor | 1.4 | 1.4 | 1.2 | 1.1 |
| overall degree of aging | 2.4 | 2.4 | 1.5 | 2.0 |

TABLE 5

|  | Comparative Example 16 control | Example 74 XAD4 (0.2) | Example 75 XAD4 (0.4) |
| --- | --- | --- | --- |
| stale odor | 2.5 | 2.1 | 2.2 |
| paper odor | 2.1 | 1.6 | 1.5 |
| oxidation odor | 1.5 | 1.4 | 1.4 |
| overall degree of aging | 2.6 | 2.1 | 2.1 |

TABLE 6

|  | Comparative Example 17 control | Example 76 XAD7 (0.1) | Example 77 XAD7 (0.2) | Example 78 XAD7 (0.4) |
| --- | --- | --- | --- | --- |
| stale odor | 2.4 | 1.6* | 1.9 | 1.9 |
| paper odor | 2.4 | 1.3** | 1.6* | 1.4 |
| oxidation odor | 0.9 | 0.6 | 0.9 | 0.8 |
| overall degree of aging | 2.4 | 1.6* | 1.7* | 1.7* |

Consequently, it has become apparent that when 0.2 g/100 ml of HP1MG is used, the paper odor and the stale odor are significantly lower than the control. It has also been confirmed that when XAD7 is used, the stale odor, the paper odor, and the overall degree of aging are all significantly lower than the control.

Next, one week after the addition of various synthetic adsorbents, the sensory evaluation was carried out with the panel number of 8 (HP1MG, SP825, and SP207) or with the panel number of 10 (XAD2, XAD4, and XAD7). Results are shown in Tables 7 and 8 (Examples 79–84 and Comparative Examples 18–19).

TABLE 7

|  | Comparative Example 18 Control | Example 79 HP1MG | Example 80 SP825 | Example 81 SP207 |
| --- | --- | --- | --- | --- |
| stale odor | 2.4 | 1.9 | 2.3 | 2.3 |
| paper odor | 2.6 | 1.3** | 1.4* | 1.1* |
| oxidation odor | 1.7 | 1.4 | 1.9 | 1.9 |
| overall degree of aging | 2.9 | 1.9** | 2.3* | 2.1** |

TABLE 8

|  | Comparative Example 19 control | Example 82 XAD2 | Example 83 XAD4 | Example 84 XAD7 |
|---|---|---|---|---|
| stale odor | 2.9 | 2.2** | 2.5 | 2.0** |
| paper odor | 2.7 | 1.5** | 1.8** | 1.5** |
| oxidation odor | 2.1 | 1.4** | 1.8 | 1.5** |
| overall degree of aging | 2.9 | 2.1** | 2.5 | 1.9** |

Consequently, it has been confirmed that when any of HP1MG, SP825, and SP207 is used, the paper odor and the overall degree of aging are significantly lower than the control. It has also been confirmed that when either XAD2 or XAD7 is used, the stale odor, the paper odor and the overall degree of aging are all significantly lowered as compared to the control and that when XAD4 is used, the paper odor is also lowered as compared to the control.

Furthermore, after the synthetic adsorbents were added following the aforementioned method, the space was filled with foam by knocking and tapping was done. Subsequently, the adsorbents were removed from the malt alcohol beverages by shaking for 2 hours and they were then stored at 37° C. for 1 week to conduct the sensory evaluation. Results are shown in Table 9 (Examples 85–88 and Comparative Example 20).

TABLE 9

|  | Comparative Example 20 control | Example 85 HP1MG (0.2) | Example 86 HP1MG (0.4) | Example 87 XAD4 (0.2) | Example 88 XAD7 (0.2) |
|---|---|---|---|---|---|
| stale odor | 2.5 | 1.6 | 1.8 | 1.9 | 1.9 |
| paper odor | 2.3 | 1.1** | 1.2** | 1.6 | 1.2** |
| oxidation odor | 1.6 | 1.1 | 1.2 | 1.2 | 1.2 |
| overall degree of aging | 2.5 | 1.4** | 1.7* | 1.8 | 1.7* |

Consequently, it has been confirmed that when HP1MG or XAD7 is used, the paper odor and the overall degree of aging are significantly lower than the control.

The results of the sensory evaluations as described above indicate that the stale flavor, especially stale odor and paper odor, has been reduced by addition of the synthetic adsorbents. Particularly, the paper odor showed noted reduction and thus the effects of adsorbent were recognized.

Examples 89–136 and Comparative Examples 21–31

To the low-malt beer or beer (each 20 liter) there were added a filtration aid (diatomaceous earth) which is used in ordinary production processes and a 2 g/l equivalent (as wet weight) of a synthetic adsorbent (HP1MG, XAD-4, or XAD-7), after which filtration was conducted. As for HP1MG, addition at a level of 4 g/l equivalent was also conducted. Thus, a preparation to which 4 g/l of HP1MG (as wet weight) had been added was made (indicated as "HP1MGX2" in the table). The filtered low-malt beer solutions were stored at 37° C. for 1 week or stored at 30° C. for 1 month, and then they were analyzed for bitterness unit (BU), the content of total polyphenol, colorimetric analysis value, HPLC peak, the content of trans-2-nonenal, and sensory evaluation.

The results of the sensory evaluation that was conducted on the low-malt beers before storage are shown in Table 10 (Examples 89–92 and Comparative 21), and the results of the sensory evaluation that was conducted on the beers before storage are shown in table 11 (Examples 93–96 and Comparative 22).

TABLE 10

|  | Comparative Example 21 control | Example 89 HP1MGX1 | Example 90 HP1MGX2 | Example 91 XAD4 | Example 92 XAD7 |
|---|---|---|---|---|---|
| flavor point | 100 | 102 | 97 | 102 | 98 |
| taste point | 100 | 94 | 94 | 94 | 97 |
| body point | 100 | 100 | 100 | 100 | 99 |
| after taste point | 100 | 100 | 104 | 99 | 103 |
| bitterness point | 100 | 103 | 103 | 101 | 101 |
| overall | 100 | 100 | 99 | 99 | 100 |

TABLE 11

|  | Comparative Example 22 control | Example 93 HP1MG | Example 94 HP20 | Example 95 XAD4 | Example 96 XAD7 |
|---|---|---|---|---|---|
| flavor point | 100 | 100 | 100 | 94 | 102 |
| taste point | 100 | 98 | 100 | 106 | 96 |
| body point | 100 | 108 | 100 | 104 | 106 |
| after taste point | 100 | 98 | 102 | 102 | 98 |
| bitterness point | 100 | 100 | 102 | 98 | 102 |
| overall | 100 | 100 | 101 | 100 | 101 |

The results of the sensory evaluation conducted on the low-malt beers after storage at 37° C. for 1 week are shown in Table 12 (Examples 97–100 and Comparative 23); the results after storage at 30° C. for 1 month are shown in Table 13 (Examples 101–104 and Comparative 24) The results of the sensory evaluation conducted on the beers after storage at 37° C. for 1 week are shown in Table 14 (Examples 105–108 and Comparative 25); the results after storage at 30° C. for 1 month are shown in Table 15 (Examples 109–112 and Comparative 26). The values were validated by examination using the Friedman calibration: in the tables "*" indicates p<0.05 and "**" indicates p<0.01.

TABLE 12

|  | Comparative Example 23 control | Example 97 HP1MGX1 | Example 98 HP1MGX2 | Example 99 XAD4 | Example 100 XAD7 |
|---|---|---|---|---|---|
| stale odor | 2.6 | 2.2 | 1.9** | 2.0* | 2.2 |
| paper odor | 2.5 | 1.5* | 1.5** | 2.0 | 1.7 |
| oxidation odor | 1.5 | 1.2 | 1.0 | 1.1 | 1.1 |
| overall degree of aging | 2.8 | 2.2 | 1.8** | 2.1* | 2.2 |

TABLE 13

|  | Comparative Example 24 control | Example 101 HP1MGX1 | Example 102 HP1MGX2 | Example 103 XAD4 | Example 104 XAD7 |
|---|---|---|---|---|---|
| stale odor | 2.3 | 1.8* | 1.9 | 1.9* | 2.3 |
| paper odor | 2.2 | 1.4 | 1.4 | 1.7 | 1.6 |
| oxidation odor | 1.6 | 1.4 | 1.6 | 1.4 | 1.6 |
| overall degree of aging | 2.3 | 1.8 | 2.0 | 1.9 | 2.4 |

TABLE 14

|  | Comparative Example 25 control | Example 105 HP1MG | Example 106 HP20 | Example 107 XAD4 | Example 108 XAD7 |
|---|---|---|---|---|---|
| stale odor | 1.7 | 1.4 | 1.2* | 1.4 | 1.6 |
| paper odor | 1.8 | 1.2 | 1.2 | 1.5 | 1.3 |
| oxidation odor | 1.1 | 0.9 | 0.9 | 1.2 | 1.0 |
| overall degree of aging | 1.9 | 1.4 | 1.2* | 1.7 | 1.6 |

TABLE 15

|  | Comparative Example 26 control | Example 109 HP1MG | Example 110 HP20 | Example 111 XAD4 | Example 112 XAD7 |
|---|---|---|---|---|---|
| stale odor | 2.3 | 1.8 | 1.9 | 2.2 | 1.9 |
| paper odor | 2.1 | 1.6* | 1.4 | 2.1 | 1.6* |
| oxidation odor | 1.3 | 1.2 | 1.3 | 1.6 | 1.4 |
| overall degree of aging | 2.2 | 1.8 | 1.9 | 2.3 | 1.8 |

Consequently, while there were some noted differences in flavor, taste or the like either between the control and the low-malt beer or between the control and the beer, they were not significant; and flavors inferior to that in the control were not noted. However, after storage at 37° C. for 1 week, in both low-malt beer and beer there were noted significant reductions in the stale flavor, especially stale odor and paper odor, as compared to the control even when any of the adsorbent was added. Furthermore, after storage at 30° C. for 1 month, reductions in the stale odor and the paper odor were significantly noted in the low-malt beers. On the other hand, reductions in the stale odor and the paper odor were noted in the beers, although the adsorption effects of the stale flavor by HP1MG and HP20 were remarkable.

The results on the bitterness unit (expressed as BU), the content of total polyphenol, and colorimetric analysis value for the low-malt beers are shown in Table 16 (Examples 113–116 and Comparative Example 26); the results on the aforementioned items for the beers are shown in Table 17 (Examples 117–120 and Comparative 27).

TABLE 16

|  | Comparative Example 26 control | Example 113 HP1MGX1 | Example 114 HP1MGX2 | Example 115 XAD4 | Example 116 XAD7 |
|---|---|---|---|---|---|
| BU | 24.5 | 20.1 | 16.4 | 23.3 | 16.4 |
| total polyphenol (mg/L) | 122 | 96 | 96 | 116 | 104 |
| chromaticity (EBC°) | 9.9 | 9.2 | 8.8 | 9.6 | 8.7 |

TABLE 17

|  | Comparative Example 27 control | Example 117 HP1MGX1 | Example 118 HP20 | Example 119 XAD4 | Example 120 XAD7 |
|---|---|---|---|---|---|
| BU | 21.9 | 21.0 | 15.4 | 18.0 | 14.8 |
| total polyphenol (mg/L) | 182 | 173 | 169 | 149 | 162 |
| chromaticity (EBC°) | 8.2 | 7.4 | 7.7 | 8.1 | 7.3 |

Consequently, portions of iso-α acid, total polyphenol and the chromaticity were adsorbed by the adsorbents in either of the low-malt beer and the beer. The amount of adsorption by XAD4 tended to be smaller than those by the other adsorbents.

Figure 20A:
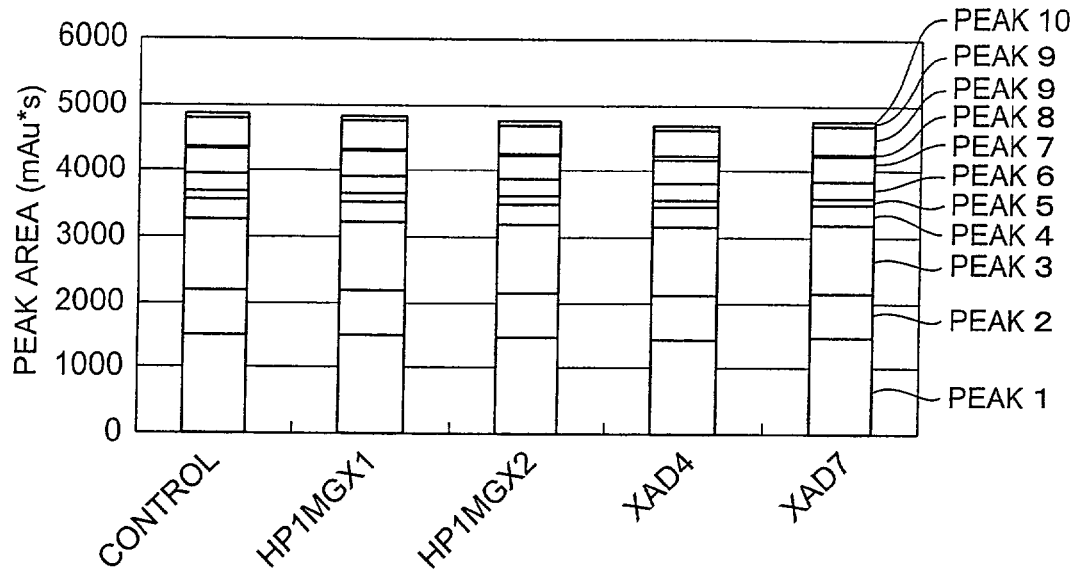
FIG. 20A is a graph showing the sum of hydrophilic peaks from the low-malt beer filtered through an adsorbent, as detected by HPLC.
Figure 20B:
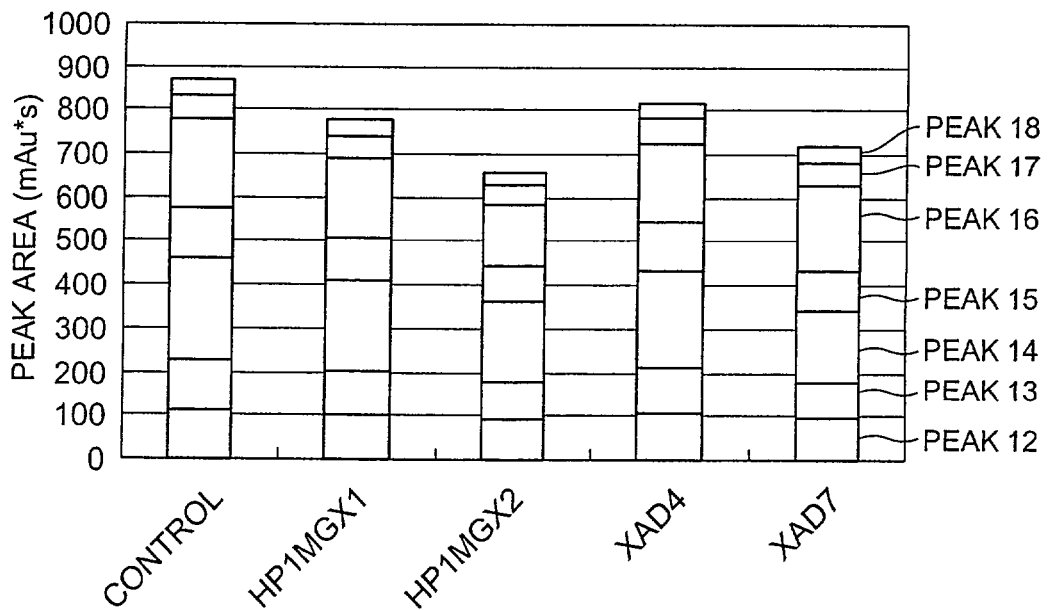
FIG. 20B is a graph showing the sum of hydrophobic peaks from the low-malt beer filtered through the adsorbent, as detected by HPLC.
Figures 21A, 21B:
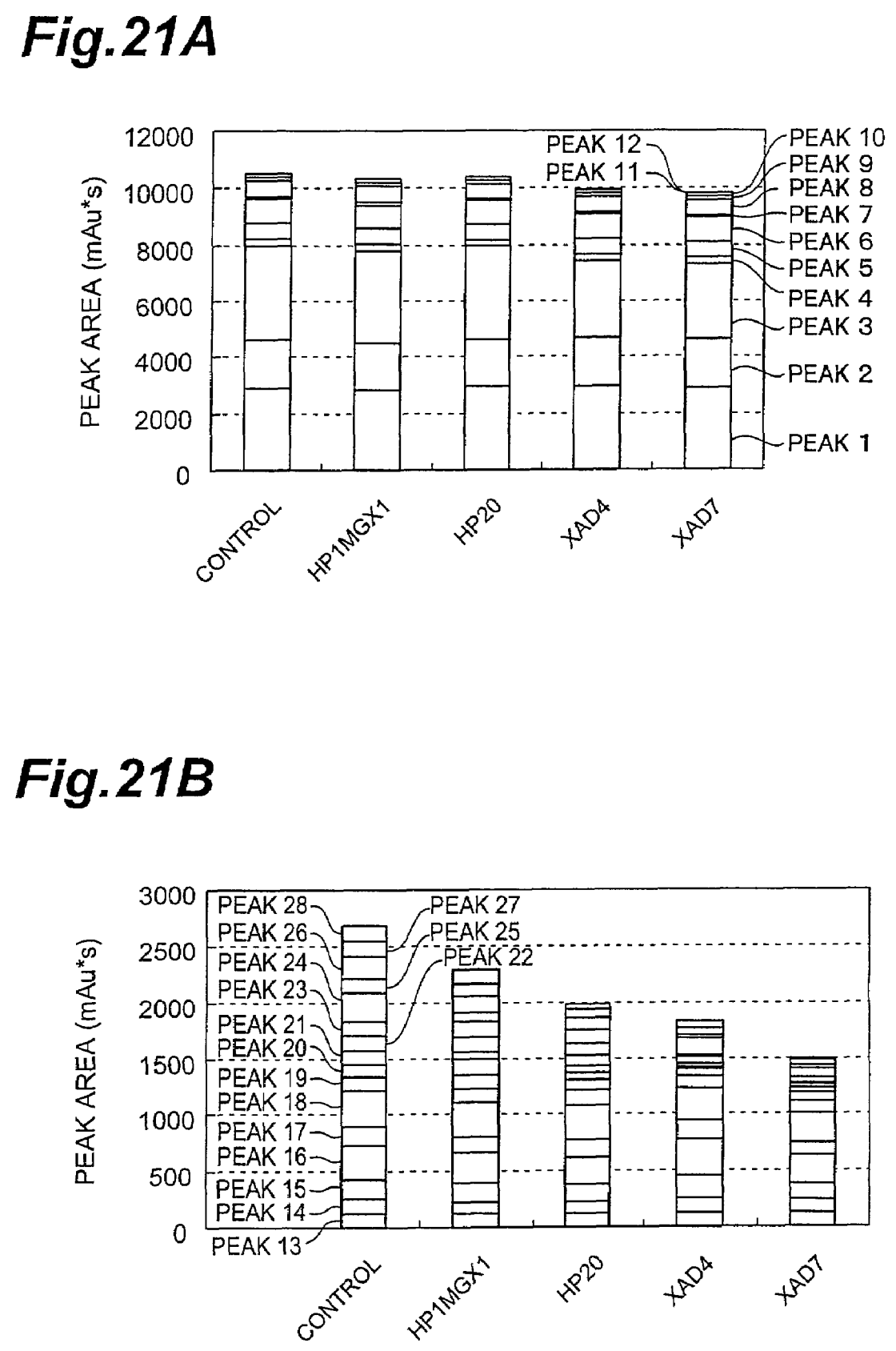

FIGS. 20–21 show the sum of peak areas as detected by HPLC. It has been confirmed that in either of the low-malt beer and the beer, HPLC peaks with high hydrophobicity are susceptible to adsorption by the adsorbents. While the amounts of adsorption by XAD4 tended to be smaller than those by the other adsorbents in the low-malt beer, there was no such tendency observed in the beer.

The contents of trans-2-nonenal contained in the low-malt beers after storage are shown in Table 18 (Examples 121–124 and Comparative Example 28); the contents of trans-2-nonenal increased during storage are shown in Table 19 (Examples 125–128 and Comparative Example 29). The contents of trans-2-nonenal contained in the beers after storage are shown in Table 20 (Examples 129–132 and Comparative Example 30); the contents of trans-2-nonenal increased during storage are shown in Table 21 (Examples 133–136 and Comparative Example 31). In the tables, "30° C.1m" indicates the cases where storage at 30° C. for 1 month was effected and "37° C.1w" indicates the cases where storage at 37° C. for 1 week was effected.

TABLE 18

|  | Comparative Example 28 control | Example 121 HP1MGX1 | Example 122 HP1MGX2 | Example 123 XAD4 | Example 124 XAD7 |
|---|---|---|---|---|---|
| 0° C. | 0.10 | 0.07 | 0.07 | 0.09 | 0.08 |
| 37° C. 1 w | 0.29 | 0.24 | 0.14 | 0.24 | 0.18 |
| 30° C. 1 m | 0.33 | 0.2 | 0.16 | 0.33 | 0.18 |

TABLE 19

|  | Comparative Example 29 control | Example 125 HP1MGX1 | Example 126 HP1MGX2 | Example 127 XAD4 | Example 128 XAD7 |
|---|---|---|---|---|---|
| 37° C. 1 w | 0.19 | 0.17 | 0.07 | 0.15 | 0.10 |
| 30° C. 1 m | 0.23 | 0.13 | 0.09 | 0.24 | 0.10 |

TABLE 20

|  | Comparative Example 30 control | Example 129 HP1MG | Example 130 HP20 | Example 131 XAD4 | Example 132 XAD7 |
|---|---|---|---|---|---|
| 0° C. | 0.08 | 0.11 | 0.07 | 0.12 | 0.08 |
| 37° C. 1 w | 0.17 | 0.14 | 0.1 | 0.15 | 0.1 |
| 30° C. 1 m | 0.18 | 0.14 | 0.12 | 0.16 | 0.1 |

TABLE 21

|  | Comparative Example 31 control | Example 133 HP1MG | Example 134 HP20 | Example 135 XAD4 | Example 136 XAD7 |
|---|---|---|---|---|---|
| 37° C. 1 w | 0.09 | 0.03 | 0.03 | 0.03 | 0.02 |
| 30° C. 1 m | 0.1 | 0.03 | 0.05 | 0.04 | 0.02 |

Consequently, trans-2-nonenal was adsorbed by the adsorbent and the content of trans-2-nonenal decreased in either of the low-malt beer and the beer even after storage, except for the case where the low-malt beer was stored with the use of XAD4 at 30° C. for 1 month. It was likely that storage in the presence of the adsorbent suppresses an increase in trans-2-nonenal. It was thus thought that elimination of precursors of trans-2-nonenal by the adsorbent was also occurring.

Examples 137–171 and Comparative Examples 32–40

After HP1MG, a synthetic adsorbent, was heated in sterilized water at 60° C. for 1 hour, it was filtered through a glass filter. This was added to the malt alcohol beverage (or beer), 633 ml, at concentrations of 0.2 g/100 ml, 1.0 g/100 ml, and 5.0 g/100 ml, respectively; and the space was filled with foam by knocking to remove as much oxygen as possible from the space, after which tapping was done. After they were shaken at room temperature for 2 hours, they were stored at 37° C. for 1 week and the sensory evaluations were carried out. The sensory evaluation was carried out according to the profile method: the trained panel evaluated color, flavor, taste, after taste, body and bitterness in a sensory manner and the data was provided for statistical analysis. Simultaneously, measurement of bitterness unit (BU) was also carried out. Results are shown in Table 22 (Examples 137–139 and Comparative Example 32).

TABLE 22

|  | Comparative Example 32 control | Example 137 0.2 g/100 ml | Example 138 1.0 g/100 ml | Example 139 5.0 g/100 ml |
|---|---|---|---|---|
| color | 100 | 100 | 95 | 79 |
| flavor | 100 | 102 | 90 | 63 |
| taste | 100 | 100 | 75 | 65 |
| after taste | 100 | 103 | 97 | 72 |
| body | 100 | 90 | 69 | 62 |
| bitterness | 100 | 98 | 77 | 67 |

TABLE 22-continued

|  | Comparative Example 32 control | Example 137 0.2 g/100 ml | Example 138 1.0 g/100 ml | Example 139 5.0 g/100 ml |
|---|---|---|---|---|
| BU adsorption (%) | 0 | 24 | 48 | 86 |

To the malt alcohol beverage (low-malt beer or beer) there was added the synthetic adsorbent, HP1MG, XAD4 or XAD7, at 2 g/l as wet weight. After storing at 30° C. for 1 month or at 37° C. for 1 week, the contents of 2-Me-propanal, 2-Me-butanal, 3-Me-butanal, and phenylacetaldehyde contained the malt alcohol beverage were determined. As for HP1MG, a preparation to which 4 g/l of HP1MG (as wet weight) had been added was made (indicated as "HP1MGX2" in the table).

The contents of 2-Me-propanal contained in the low-malt beers after storage are shown in Table 23 (Example 140–143 and Comparative Example 33), the contents of 2-Me-butanal in Table 24 (Example 144–147 and Comparative Example 34), the contents of 3-Me-butanal in Table 25 (Example 148–151 and Comparative Example 35), and the contents of phenylacetaldehyde in Table 26 (Example 152–155 and Comparative Example 36). The contents of 2-Me-propanal contained in the beers after storage are shown in Table 27 (Example 156–159 and Comparative Example 37), the contents of 2-Me-butanal in Table 28 (Example 160–163 and Comparative Example 38), the contents of 3-Me-butanal in Table 29 (Example 164–167 and Comparative Example 39), and the contents of phenylacetaldehyde in Table 30 (Example 168–171 and Comparative Example 40). In the tables, "30° C.1m" indicates the cases where storage was effected at 30° C. for 1 month and "37° C.1w" indicates the cases where storage was effected at 37° C. for 1 week. The numerals in the tables are expressed as relative values when the control was taken as 100.

TABLE 23

|  | Comparative Example 33 control | Example 140 HP1MGX1 | Example 141 HP1MGX2 | Example 142 XAD4 | Example 143 XAD7 |
|---|---|---|---|---|---|
| 0° C. | 100 | 76 | 63 | 80 | 72 |
| 37° C. 1 w | 100 | 89 | 87 | 94 | 83 |
| 30° C. 1 m | 100 | 88 | 84 | 89 | 81 |

TABLE 24

|  | Comparative Example 34 control | Example 144 HP1MGX1 | Example 145 HP1MGX2 | Example 146 XAD4 | Example 147 XAD7 |
|---|---|---|---|---|---|
| 0° C. | 100 | 68 | 58 | 84 | 68 |
| 37° C. 1 w | 100 | 73 | 60 | 83 | 67 |
| 30° C. 1 m | 100 | 84 | 71 | 85 | 63 |

TABLE 25

|  | Comparative Example 35 control | Example 148 HP1MG | Example 149 HP1MGX2 | Example 150 XAD4 | Example 151 XAD7 |
|---|---|---|---|---|---|
| 0° C. | 100 | 71 | 67 | 76 | 73 |
| 37° C. 1 w | 100 | 83 | 78 | 86 | 82 |
| 30° C. 1 m | 100 | 88 | 79 | 83 | 76 |

TABLE 26

|  | Comparative Example 36 control | Example 152 HP1MG | Example 153 HP1MGX2 | Example 154 XAD4 | Example 155 XAD7 |
|---|---|---|---|---|---|
| 0° C. | 100 | 115 | 84 | 107 | 108 |
| 37° C. 1 w | 100 | 98 | 106 | 86 | 96 |
| 30° C. 1 m | 100 | 101 | 101 | 89 | 89 |

TABLE 27

|  | Comparative Example 37 control | Example 156 HP1MGX1 | Example 157 HP1MGX2 | Example 158 XAD4 | Example 159 XAD7 |
|---|---|---|---|---|---|
| 0° C. | 100 | 78 | 58 | 75 | 64 |
| 37° C. 1 w | 100 | 98 | 93 | 103 | 94 |
| 30° C. 1 m | 100 | 92 | 82 | 88 | 82 |

TABLE 28

|  | Comparative Example 38 control | Example 160 HP1MGX1 | Example 161 HP1MGX2 | Example 162 XAD4 | Example 163 XAD7 |
|---|---|---|---|---|---|
| 0° C. | 100 | 89 | 82 | 91 | 85 |
| 37° C. 1 w | 100 | 90 | 85 | 97 | 85 |
| 30° C. 1 m | 100 | 92 | 88 | 90 | 88 |

TABLE 29

|  | Comparative Example 39 control | Example 164 HP1MG | Example 165 HP1MGX2 | Example 166 XAD4 | Example 167 XAD7 |
|---|---|---|---|---|---|
| 0° C. | 100 | 80 | 73 | 77 | 72 |
| 37° C. 1 w | 100 | 98 | 72 | 78 | 72 |
| 30° C. 1 m | 100 | 91 | 86 | 85 | 87 |

TABLE 30

|  | Comparative Example 40 control | Example 168 HP1MG | Example 169 HP1MGX2 | Example 170 XAD4 | Example 171 XAD7 |
|---|---|---|---|---|---|
| 0° C. | 100 | 93 | 73 | 84 | 74 |
| 37° C. 1 w | 100 | 88 | 78 | 88 | 81 |
| 30° C. 1 m | 100 | 84 | 75 | 84 | 81 |

Consequently, 2-Me-propanal, 2-Me-butanal and 3-Me-butanal were all adsorbed by any of the synthetic adsorbents, and their contents in the malt alcohol beverages decreased. However, no clear adsorption for penylacetaldehyde was noted when HP1MG was used in the low-malt beer, but the tendency of adsorption was observed with the use of XAD4 and XAD7. On the other hand, phenylacetaldehyde showed sufficient adsorption in the beer and its content decreased after adsorption.

INDUSTRIAL APPLICABILITY

As described above, the method of producing a malt alcohol beverage according to this invention allows for providing a method of producing a malt alcohol beverage such that by removing through adsorption rough flavor components with the aid of an adsorbent during the production process of the malt alcohol beverage, the aging of flavor after production can be suppressed and the flavor immediately after production can be maintained.

The invention claimed is:

1. A method of producing a malt alcohol beverage, comprising:
    removing through adsorption at least a part of rough flavor components from malt, a malt alcohol beverage intermediate product, or the malt alcohol beverage with the aid of an adsorbent resin selected from the group consisting of a strongly basic anion-exchange resin, and a weakly basic anion-exchange resin;
    wherein said adsorbent resin adsorbs hydrophobic components; and
    wherein the rough flavor component is a causative substance for aging of flavor or a precursor thereof.
2. The method of producing a malt alcohol beverage according to claim 1, wherein the rough flavor component is a carbonyl compound or a Maillard compound.
3. The method of producing a malt alcohol beverage according to claim 1, wherein the rough flavor component is an organic acid.
4. The method according to claim 1, further comprising:
    mixing a raw material containing malt with water, thereby obtaining a mixture;
    saccharifying the malt by warming the mixture, thereby obtaining saccharified malt; collecting wort from the saccharified malt;
    fermenting the wort by addition of yeast thereto, thereby obtaining the malt alcohol beverage intermediate product;
    storing the malt alcohol beverage intermediate product; and
    filtering the malt alcohol beverage intermediate product to produce the malt alcohol beverage.
5. The method according to claim 4, wherein said rough flavor components are removed before the filtration of the malt alcohol beverage intermediate product.

6. The method according to claim 1, wherein said adsorbent reduces a stale flavor of said malt alcohol beverage.

7. The method according to claim 1, wherein the adsorbent is a styrene or acrylic basic anion exchange resin.

8. The method according to claim 1, wherein the rough flavor component is propanal, hexanal, hexenal, pentanal, furfural, trans-2-nonenal, phenylacetaldehyde or a mixture thereof.

9. The method according to claim 1, wherein the rough flavor component is 5-hydroxymethylfurfural, an Amadori substance, a precursor of an Amadori substance or a mixture thereof.

10. The method according to claim 1, wherein the rough flavor component is selected from the group consisting of glucose-glycine, glucose-alanine, glucose-leucine, glucose-isoleucine, fructose-proline, fructose-glutamic acid, fructose-serine, fructose-threonine and mixtures thereof.

11. The method according to claim 1, wherein the rough flavor component is a heterocyclic compound having a pyrazine ring, pyrrole ring, or imidazole ring.

12. The method according to claim 1, wherein the rough flavor component is a product of the decomposition of an unsaturated fatty acid.

13. The method according to claim 1, wherein an unsaturated fatty acid is removed.

14. The method according to claim 12, wherein said unsaturated fatty acid is selected from the group consisting of pyroglutamic acid, acetic acid, lactic acid, succinic acid, malic acid, pyruvic acid, citric acid, fumaric acid, isocitric acid and mixtures thereof.

15. The method according to claim 1, wherein a decrease in a degree of bitterness of the malt alcohol beverage after the adsorption is 0–50%.

* * * * *